United States Patent [19]

Gilfillen et al.

[11] 4,032,890
[45] June 28, 1977

[54] ARRANGEMENT FOR CONTROLLING SEIZURE OF A CONNECTOR

[75] Inventors: Lester Ray Gilfillen, Columbus, Ohio; Edward Nicholas Shipley, Holmdel, N.J.; Ray Keith Zies, Reynoldsburg, Ohio

[73] Assignee: Bell Telephone Laboratories, Incorporated, Murray Hill, N.J.

[22] Filed: June 16, 1976

[21] Appl. No.: 696,748

[52] U.S. Cl. .................... 340/147 C; 179/175.2 R
[51] Int. Cl.² .................... H04M 3/22; H04Q 9/00
[58] Field of Search ........... 340/147 R, 147 C, 151, 340/152 R; 179/175.2 R, 175.2 C, 18 E

[56] References Cited

UNITED STATES PATENTS

| | | | |
|---|---|---|---|
| 2,508,052 | 5/1950 | Williford | 179/175.2 R |
| 3,892,928 | 7/1975 | Casterline et al. | 179/175.2 R |
| 3,898,395 | 8/1975 | Crosley et al. | 179/175.2 R |
| 3,952,172 | 4/1976 | Penn et al. | 179/175.2 R |

Primary Examiner—Donald J. Yusko
Attorney, Agent, or Firm—S. N. Turner

[57] ABSTRACT

A prior art crossbar switching system provides a test frame connector which may be seized by a marker for the purpose of causing a trouble data record to be made (e.g., by a trouble recorder card perforator). All markers compete for normal seizure of the connector by means of the usual connector seizure circuit arrangement of preference relays and connector relays whereby normal marker seizure attempts are recognized and served so that only one normal seizure at a time is permitted. A new interface circuit is provided so that a computer can effect a special seizure of an idle-connector and so that no normal seizure attempt can be recognized by the seizure circuit while the special seizure situation prevails; however, the interface can detect a normal seizure attempt which occurs at any time while the special seizure is in the process of being effected. Upon detection of such a normal seizure attempt, the interface causes the cessation of the special seizure situation so that the normal seizure attempt can be recognized and served. Thus, any such special seizure situation is rendered transparent to normal marker seizure attempts. Also, the interface permits the computer to intercept a normal marker seizure of the connector so that the computer can either collect the trouble data in lieu of the perforation of a trouble card or can allow the usual trouble card to be perforated.

17 Claims, 14 Drawing Figures

FIG. 5
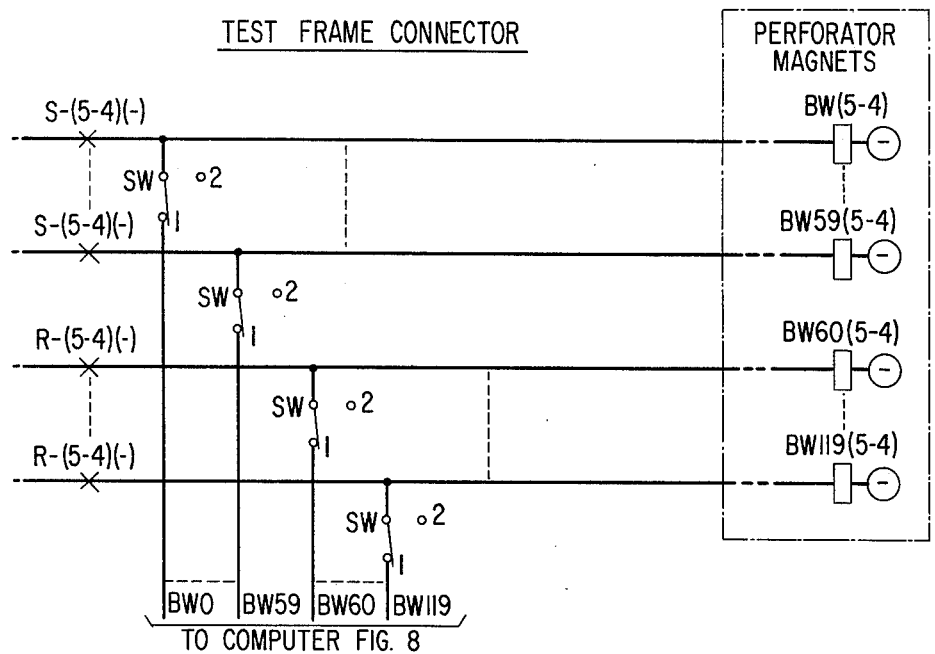
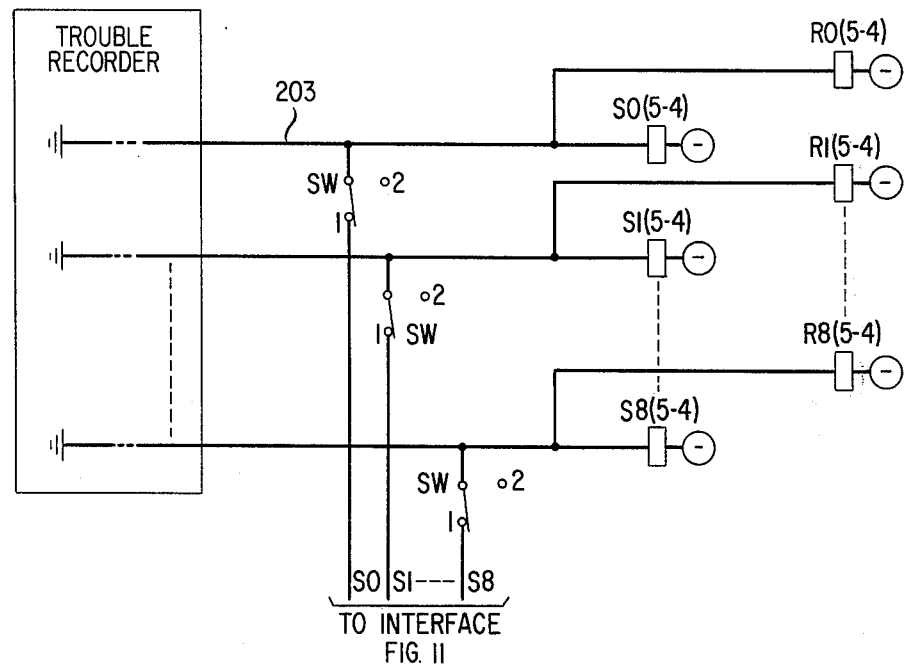
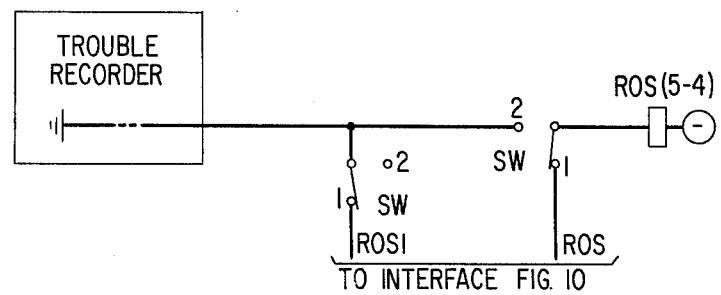

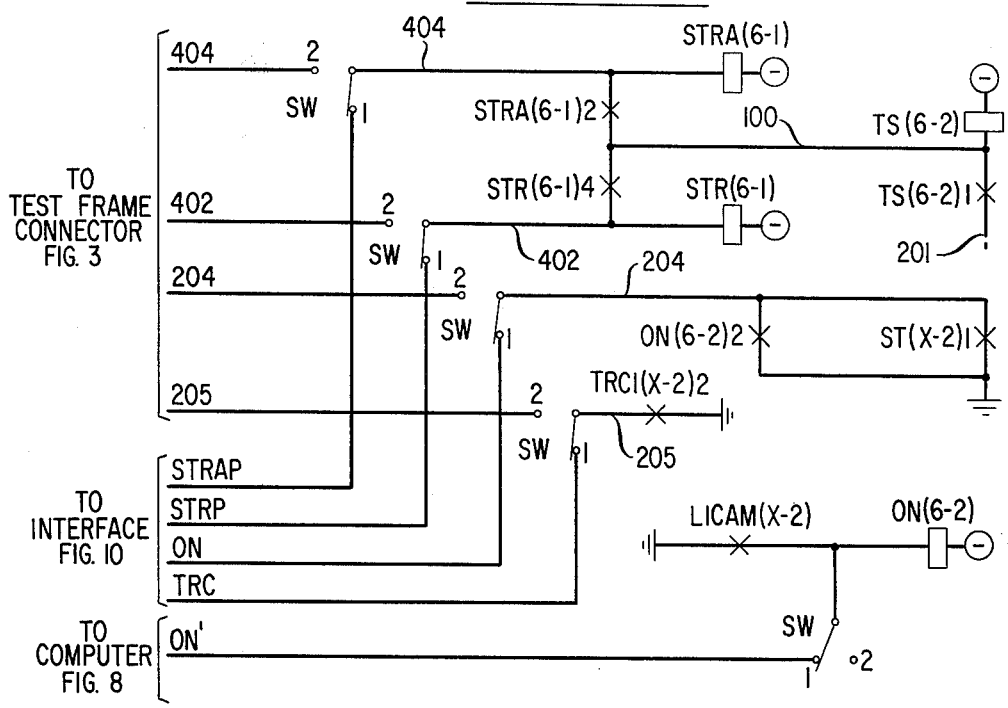
FIG. 6
TROUBLE RECORDER
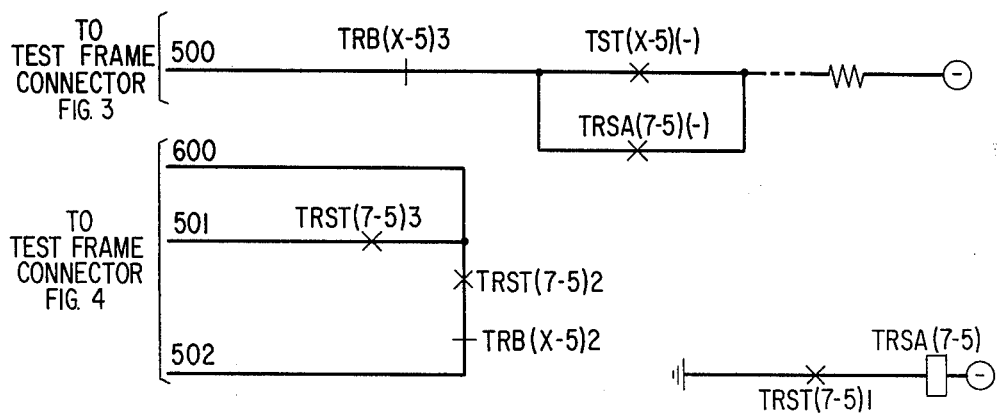
FIG. 7
MARKER
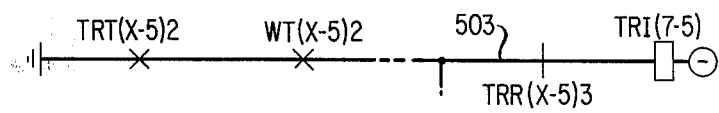
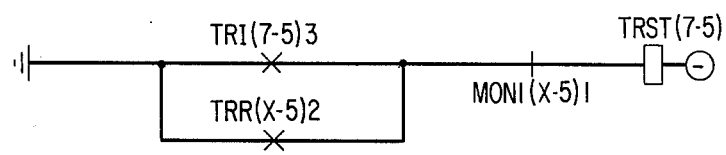

INTERFACE

INTERFACE

INTERFACE

MARKER BID

ARRANGEMENT FOR CONTROLLING SEIZURE OF A CONNECTOR

BACKGROUND OF THE INVENTION

The present invention lies in the field of arrangements for controlling normal seizure of connectors by one or more service circuits. Such arrangements generally include some sort of connector seizure circuit for recognizing at least one seizure attempt and for permitting seizure to take place responsive to recognition of such a seizure attempt. Prior such seizure circuits generally include circuitry whereby only one such connector seizure at a time may be permitted and whereby no other seizure can occur until the permitted seizure ceases; however, in such prior circuitry, the cessation of a seizure cannot be controlled by the seizure circuit itself, and thus each new connector seizure must await the relinquishing by a service circuit of the previous seizure.

In the above general area, one finds a variety of such connector seizure circuits including the well-known type involving a preference relay for each service circuit and a connector relay for each service circuit. The preference relays are interconnected with each other so that a preference relay of higher assigned preference can operate to recognize a seizure attempt by the corresponding service circuit even though a preference relay of lower assigned preference may also be operated. Also, the connector relays are controlled by the preference relays so that only one connector relay at a time can be operated by the corresponding operated preference relay to establish one connector seizure at a time. Also, once a connector seizure has been permitted to take place, the preference-connector circuitry locks-out any other seizure attempt until the connector seizure is released by the service circuit which caused the seizure to take place.

SUMMARY OF THE INVENTION

The present invention provides an arrangement for controlling seizure of a connector of the type wherein a connector seizure circuit is provided for recognizing an attempt to effect normal seizure of the connector and wherein the seizure circuit is responsive to a recognized normal seizure attempt to permit normal seizure.

In the above prior art context, the invention generally provides (1) means independent of the seizure circuit for registering an attempt to effect special seizure of the connector, (2) special means rendered effective by the registering means, while a special seizure attempt is registered therein, for detecting a normal seizure attempt while preventing recognition thereof by the seizure circuit, and (3) means controlled by the effective special means, incident to detection of a normal seizure attempt, to remove the registration from the registering means so as to allow normal seizure attempt recognition by the seizure circuit.

By the above arrangement, the invention permits a normal seizure attempt to be detected even though a special seizure attempt is being served, and allows such a detected normal seizure attempt to be recognized. The arrangement of the invention thus in effect renders the special seizure attempt transparent to any normal seizure attempt.

In a more particular sense, the above prior art context provides a seizure circuit comprising means normally enabled so as to recognize a normal seizure attempt; and, the effective special means of the invention comprises means for disabling the normally enabled means.

Still more particularly, the normally enabled means of the seizure circuit comprises a current responsive device and means for normally causing a current flow through the device such as to operate the device as recognition of a normal seizure attempt; and, the disabling means comprises means for reducing the current flow sufficiently to prevent the operation of the device.

Still more particularly, the invention provides for reducing the current flow by adding current limiting impedance in series with the current responsive device.

Specifically, the current limiting impedance of the above comprises a sensitive current responsive device operable by the reduced current flow; and, still more specifically, the operation of the sensitive device is used to control the removal of the special seizure attempt registration.

A still more specific aspect of the prior art context provides a connector seizure circuit for recognizing at least one attempt by one or more of a plurality of seizure circuits and for being responsive to one or more recognized normal seizure attempts to permit one normal seizure at a time.

In the latter more specific prior art context, the invention provides features similar to those above described but arranged to exercise control over the connector seizure circuit by the use of a normal current responsive device individual to each seizure circuit.

A particular prior art context finds the usual preference relay individual to each service circuit where each preference relay is operable by a prescribed minimum current so as to recognize a normal seizure attempt; and, the invention provides features similar to those above described but arranged to exercise control over the preference relays individual to the service circuits.

BRIEF DESCRIPTION OF THE DRAWING

The drawing consists of 13 sheets having 14 figures briefly describable as follows:

FIGS. 3 through 5 provide circuit detail of some of the circuitry of FIG. 1, particularly part of the Test Frame Connector;

FIG. 6 provides some circuit detail of the Trouble Recorder of FIG. 1;

FIG. 7 provides some circuit detail of one of the Markers of FIG. 1;

DETAILED DESCRIPTION

The detailed description to follow of the exemplary embodiment of the invention is divided into eight sections as indicated by the following underlined subsections:

Prior Art Context

Symbols and Conventions

Figure 1:
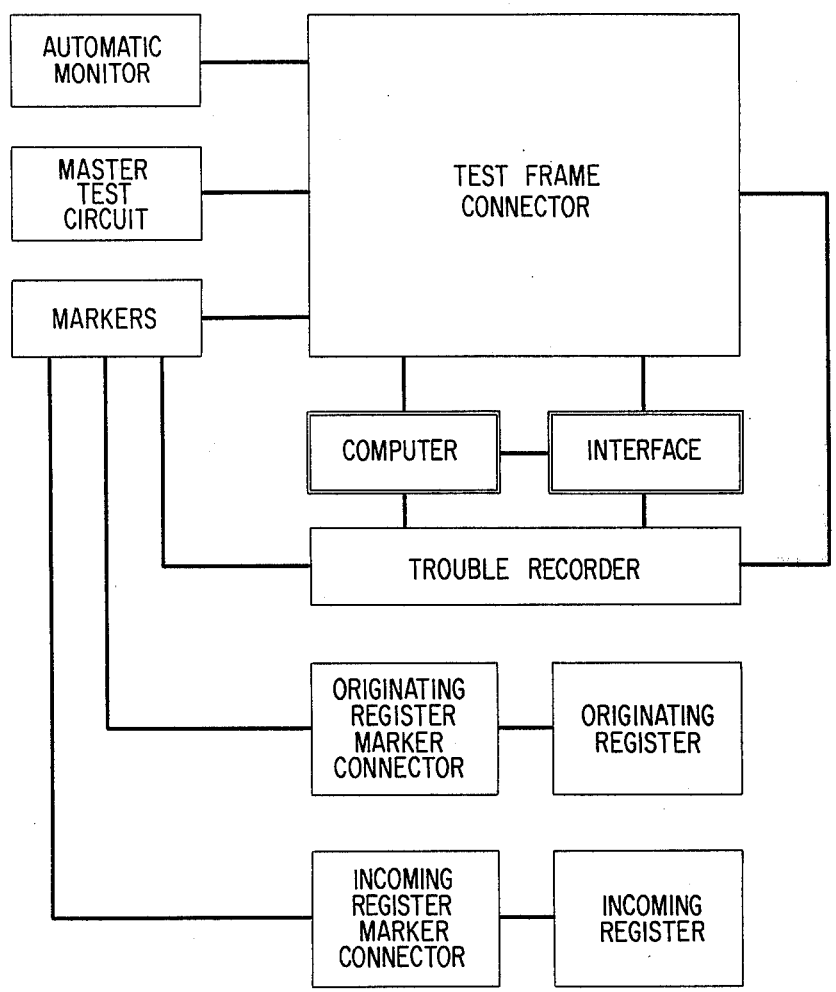
FIG. 1 is a block diagram of a crossbar switching system including an embodiment of the invention.

Block Diagram (FIG. 1)

Figure 8:
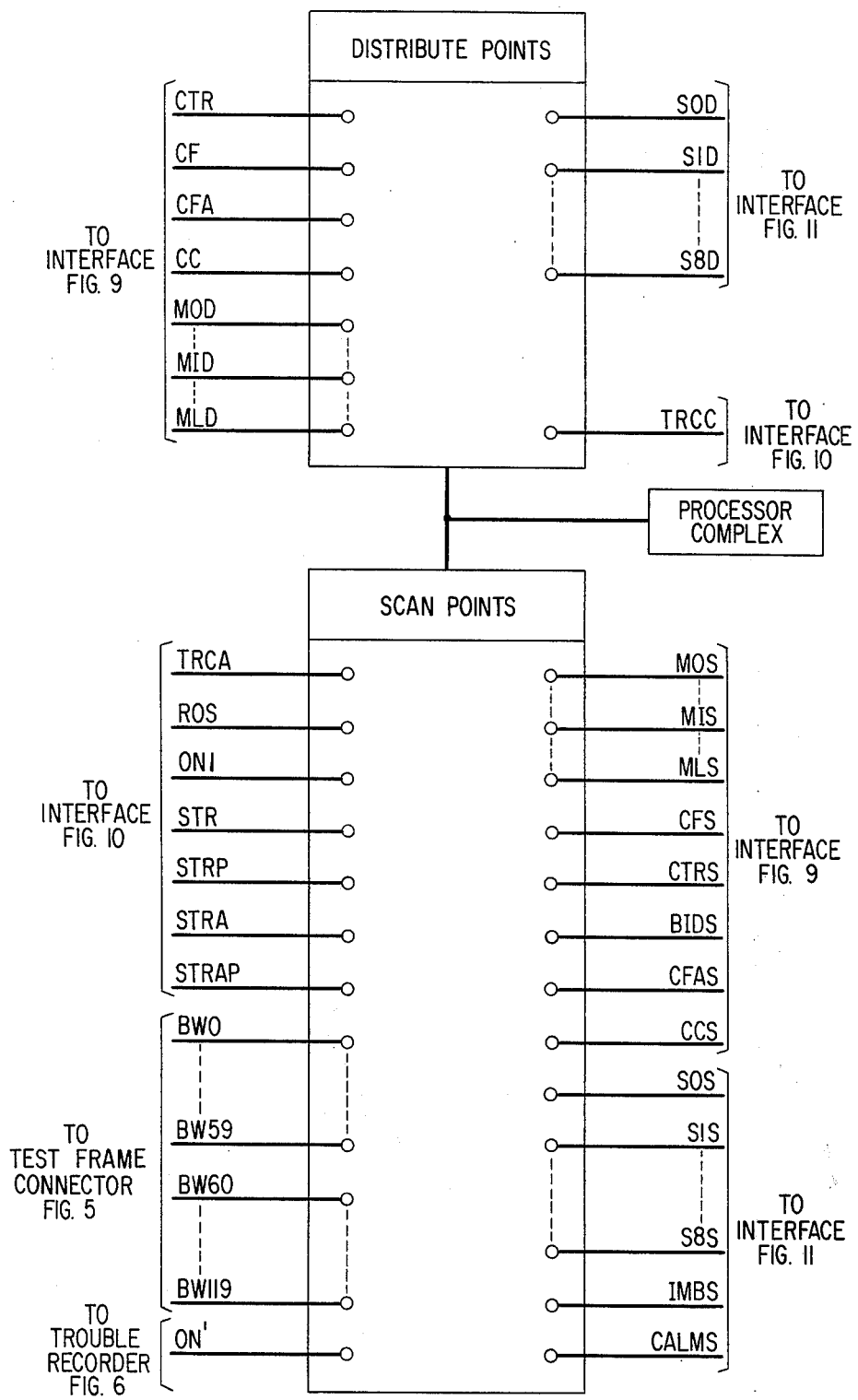
FIG. 8 illustrates the general make-up of the Computer of FIG. 1.

Computer (FIG. 8)

Figure 2:
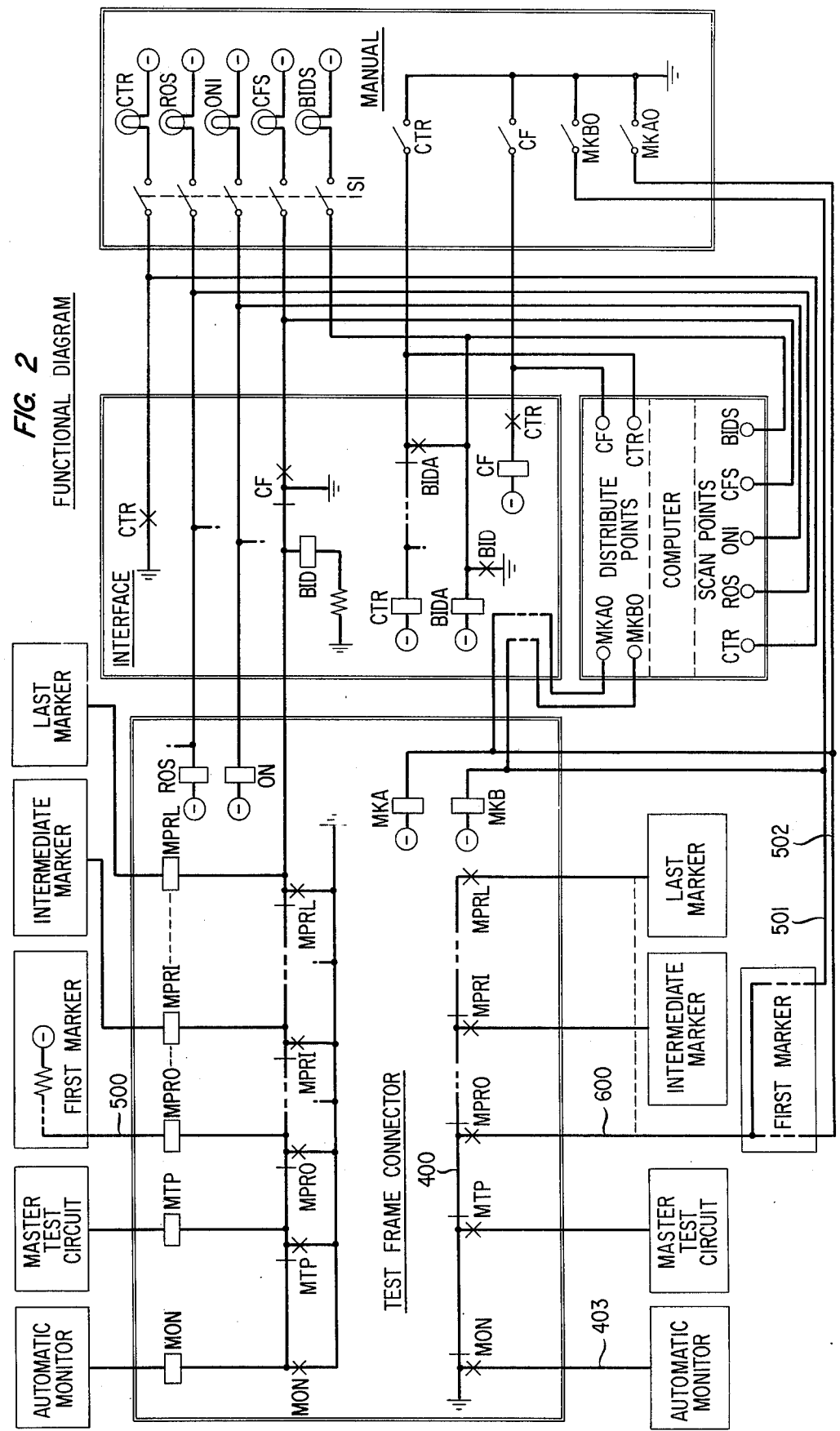
FIG. 2 is a highly skeletonized functional diagram illustrating the broad concept of the invention as embodied in the system of FIG. 1.

Functional Diagram (FIG. 2)

Marker Trouble Seizure

Computer Intercept of Trouble Seizure

Computer Seizure — No Marker Bid

Computer Seizure — Marker Bid

Prior Art Context

The exemplary embodiment is disclosed in the general context of an early embodiment of the Bell System No. 5 Crossbar Telephone Switching System as set forth in U.S. Pat. No. 2,585,904 to A.J. Busch of Feb. 19, 1952 and in the particular context of such a system wherein a trouble recorder of the card punch type is used to effect a trouble data record of marker troubles, as set forth in U.S. Pat. No. 2,508,052 to O. H. Williford of May 16, 1950, each of which is included herein by reference.

The block diagram of FIG. 1 shows in single-line boxes the main functional parts of Williford and shows in double-line boxes the relationship to Williford of the Computer and the Interface as disclosed herein as an example of how the present invention may be embodied in such a system.

SYMBOLS AND CONVENTIONS

Busch and Williford are set forth in the style of electromechanical schematic wherein all relay contacts are shown physically next to the relay coil which controls these contacts. Also, a back or break contact is shown as a closed pair of contacts when the associated relay is released and is understood to open when the associated relay is operated, such as contact 1 of relay ON of Williford FIG. 2; a front or make contact is shown as an open pair of contacts when the associated relay is released and is understood to close when the associated relay is operated, such as contact 2 of relay ON of Williford FIG. 2; and, a transfer contact is shown as a make-break or front-back combination of contacts, such as the transfer combination of contacts 2 and 3 of relay TS of Williford FIG. 2. In the present disclosure, the well-known detached contact type of schematic is used wherein a back or break contact is shown as a dash across a circuit path, such as contact TRC2(X-4)1 in FIG. 3; wherein a front or make contact is shown as an X across a circuit path, such as contact MON(3-4)3 in FIG. 3; and, wherein a transfer contact is shown as a make-break or front-back combination of contacts, such as the transfer pair MTP(3-4)3-4 in FIG. 3.

Figure 3:
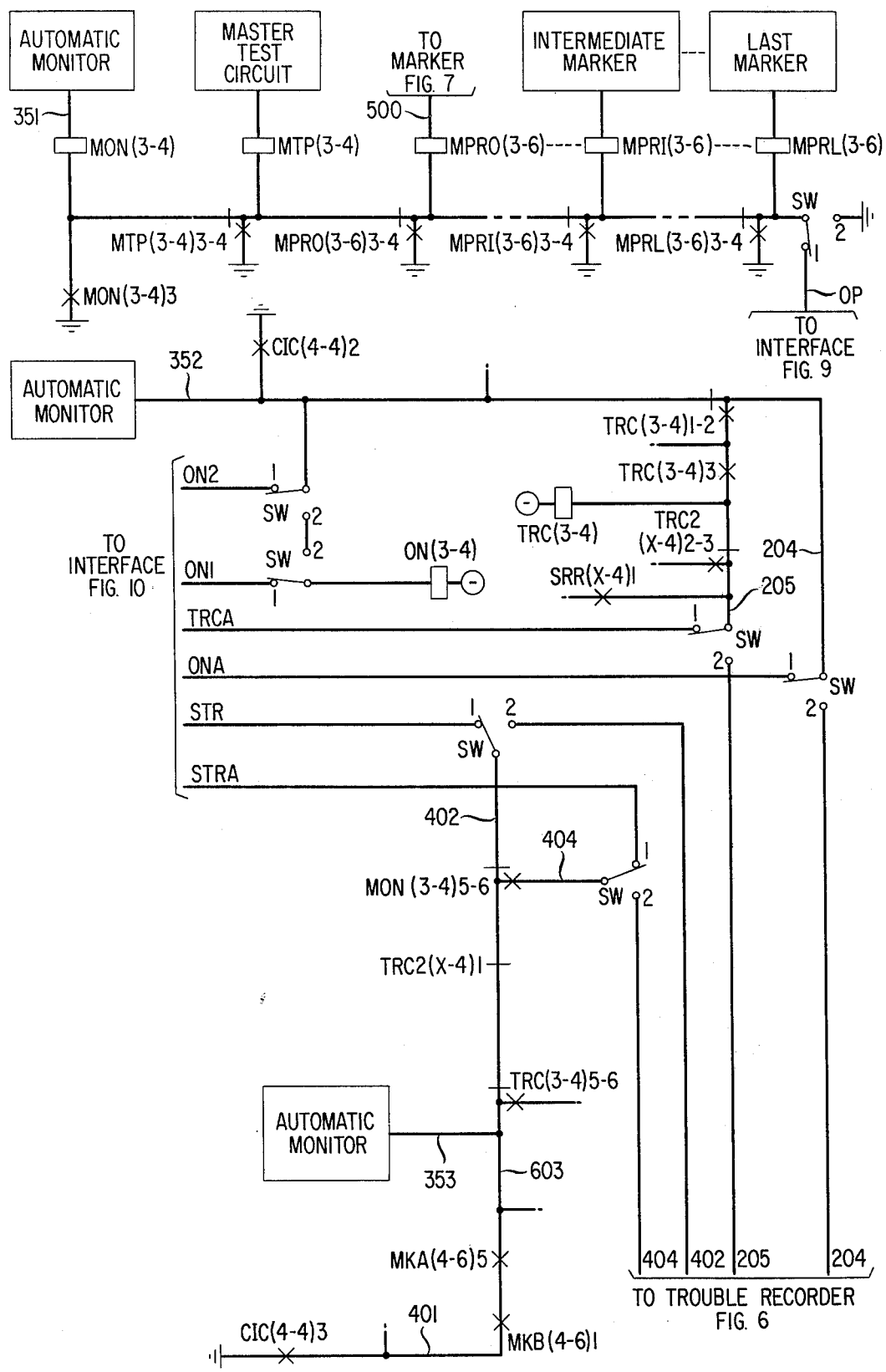
Figure 9:
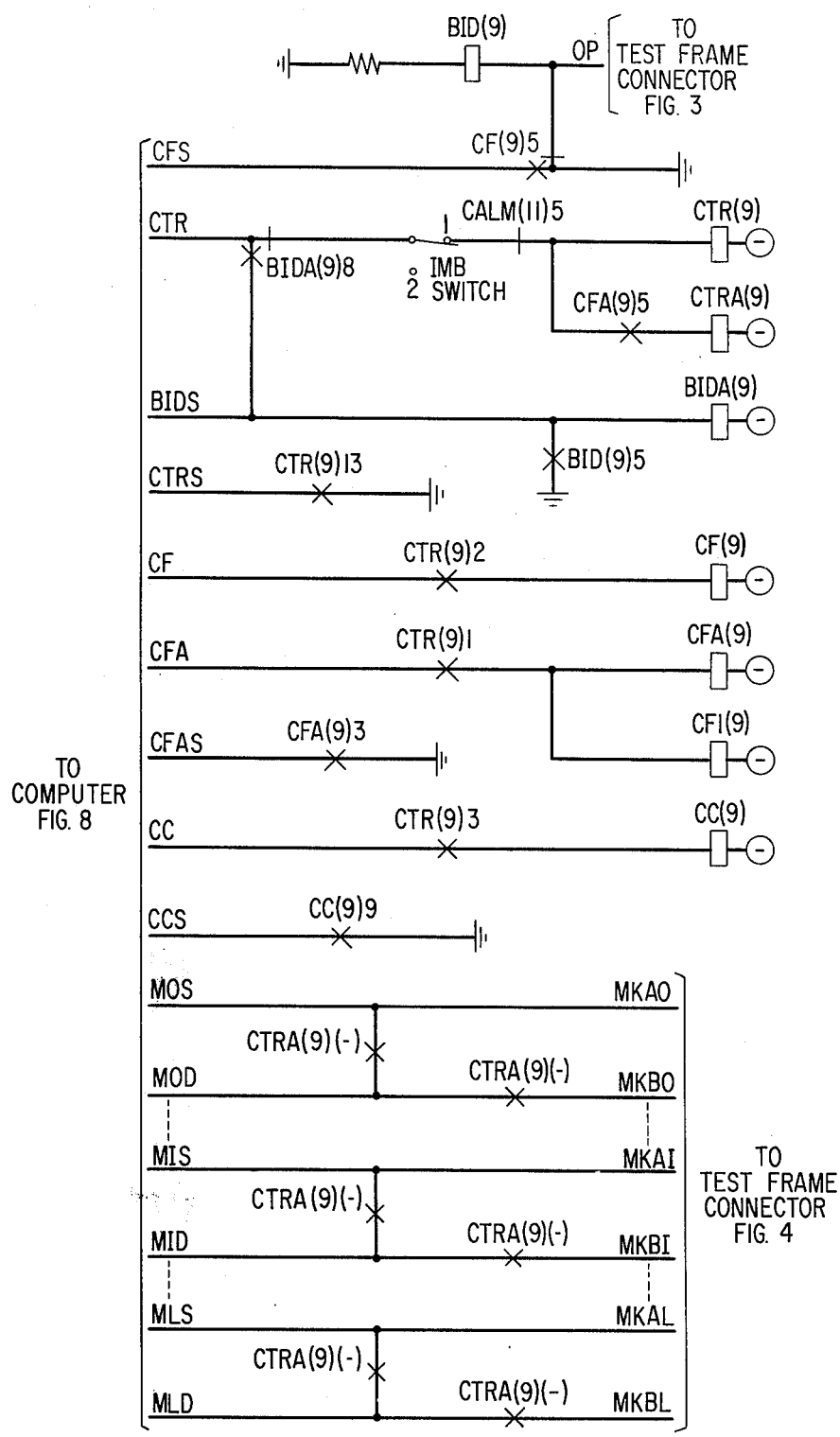
FIGS. 9, 10, and 11 show the pertinent circuitry of the Interface of FIG. 1.
Figure 10:
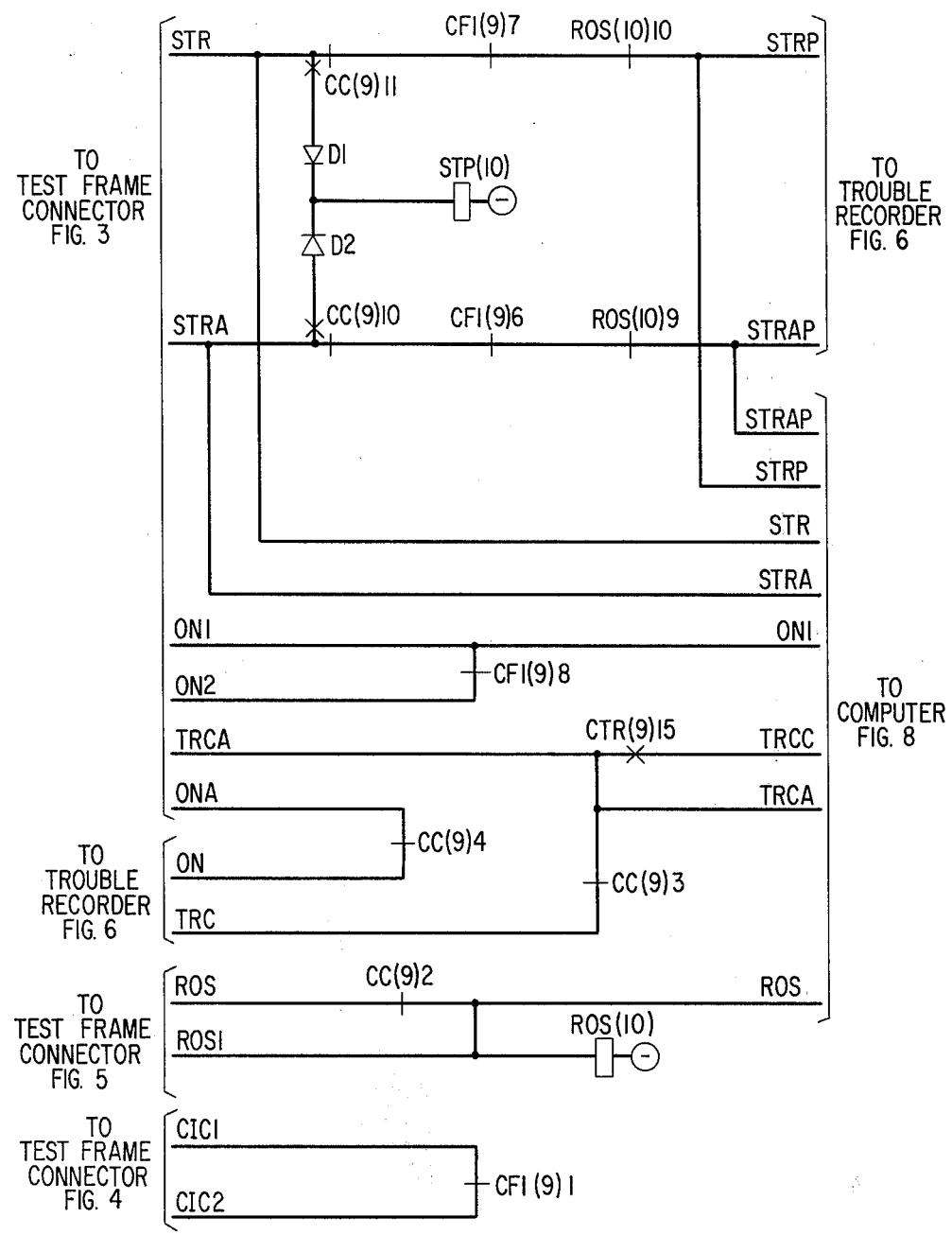
Figure 11:
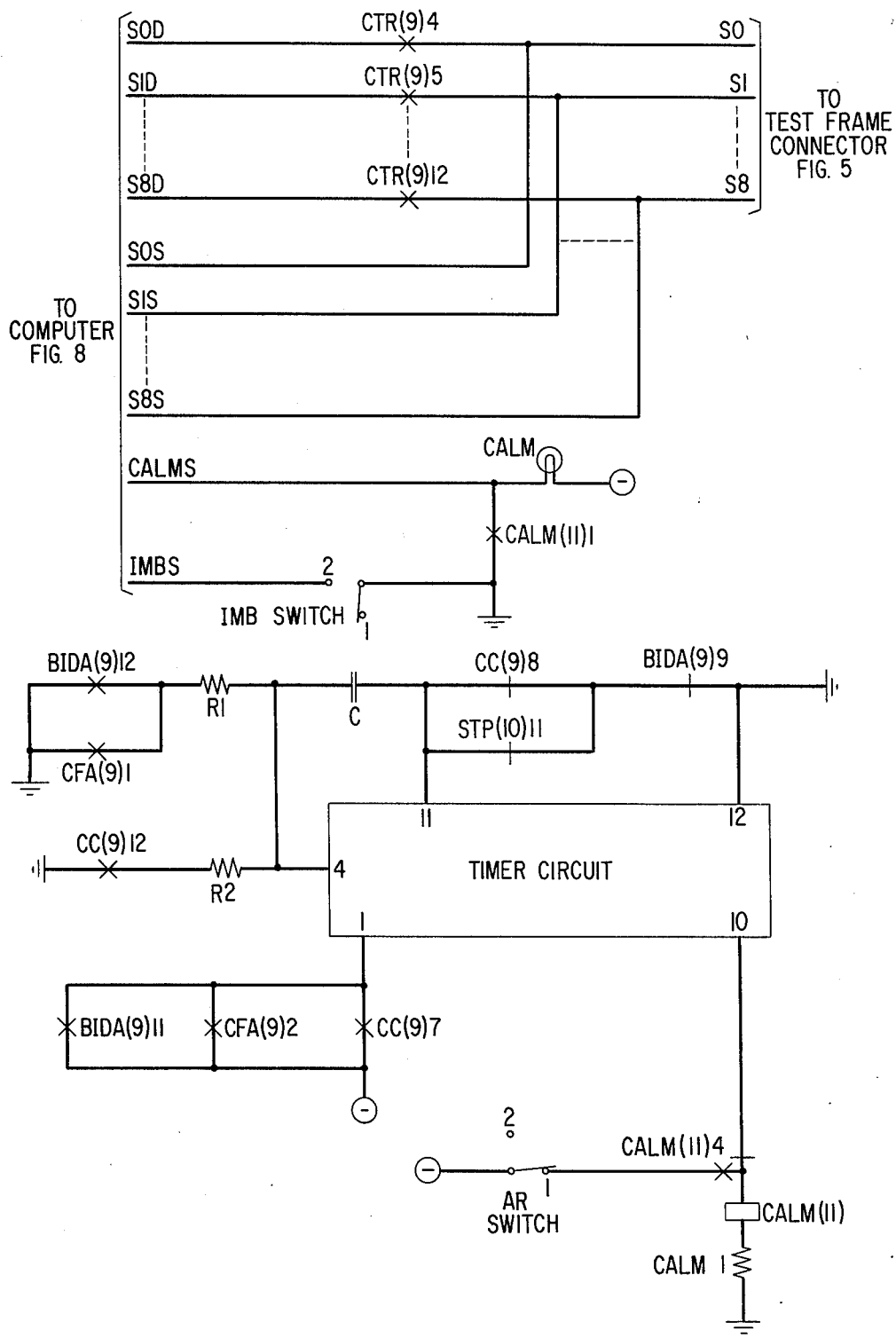

A relay winding is shown herein with a reference designation indicating whether or not it is also shown in Williford. The relay MON(3-4) of FIG. 3 indicates by its parenthetical designation (3-4) that the relay appears herein in FIG. 3 and appears in Williford as relay MON in FIG. 4; and, the make contact MON(3-4)3 in FIG. 3 herein shows by its designation that it is contact number 3 of the relay MON(3-4). In FIG. 3 herein, a contact such as make contact SRR(X-4)1 indicates that it is contact number 1 of the SRR relay of Williford FIG. 4; but, the "X" in the parentheses indicates that the relay winding is not shown herein. A transfer pair is shown herein such as contact pair MTP(3-4)3-4 to indicate that the separate make and break contacts carry the numbers 3 and 4 (or vice versa) of the relay MTP of FIG. 4 of Williford and of the relay MTP(3-4) of FIG. 3 herein. Whenever a relay contact is shown both herein and in Williford but has no contact number in Williford, it is shown herein such as contact MKA(4-6)(-) in FIG. 4. In FIGS. 9, 10, and 11 herein, where a relay is shown which does not correspond to any relay shown in Williford, the relay is designated such as relay BID(9) of FIG. 9 indicating that it appears only in FIG. 9 herein. Similarly, a numbered contact of relay BID(9) is shown herein such as make contact BID(9)5 in FIG. 9; an unnumbered contact of a relay CTRA(9) is shown herein such as make contact CTRA(9)(-) in FIG. 9; and, a transfer pair of a relay CF(9) is shown herein as transfer pair CF(9)5 in FIG. 9.

In FIGS. 3 through 6, a circuit lead may be designated by a number, such as lead 351 in FIG. 3: the lead number is the same in Williford. In some cases a lettered designation on a lead indicates that the lead does not appear in Williford but appears as a part of the disclosure added herein, such as lead STR in FIG. 3.

In FIGS. 3 through 6 are shown a number of single-pole, single-throw switches designated SW with terminals 1 and 2. All of these separately shown switches are to be considered as a single unit. As will be described later, when switches SW are contacting their contacts 2, the circuitry duplicates the pertinent parts of the Williford disclosure; and, when switches SW are contacting their contacts 1, the circuitry is modified so as to perform according to the exemplary disclosure herein of the present invention.

A symbol on the schematic showing of FIGS. 2 through 7 and 9 through 11 of a minus sign inside of a circle indicates the negative terminal of a suitable direct-current source of electrical power whose positive terminal is assumed to be at zero volts direct current or ground potential as shown by the usual symbol for ground.

Figure 12:
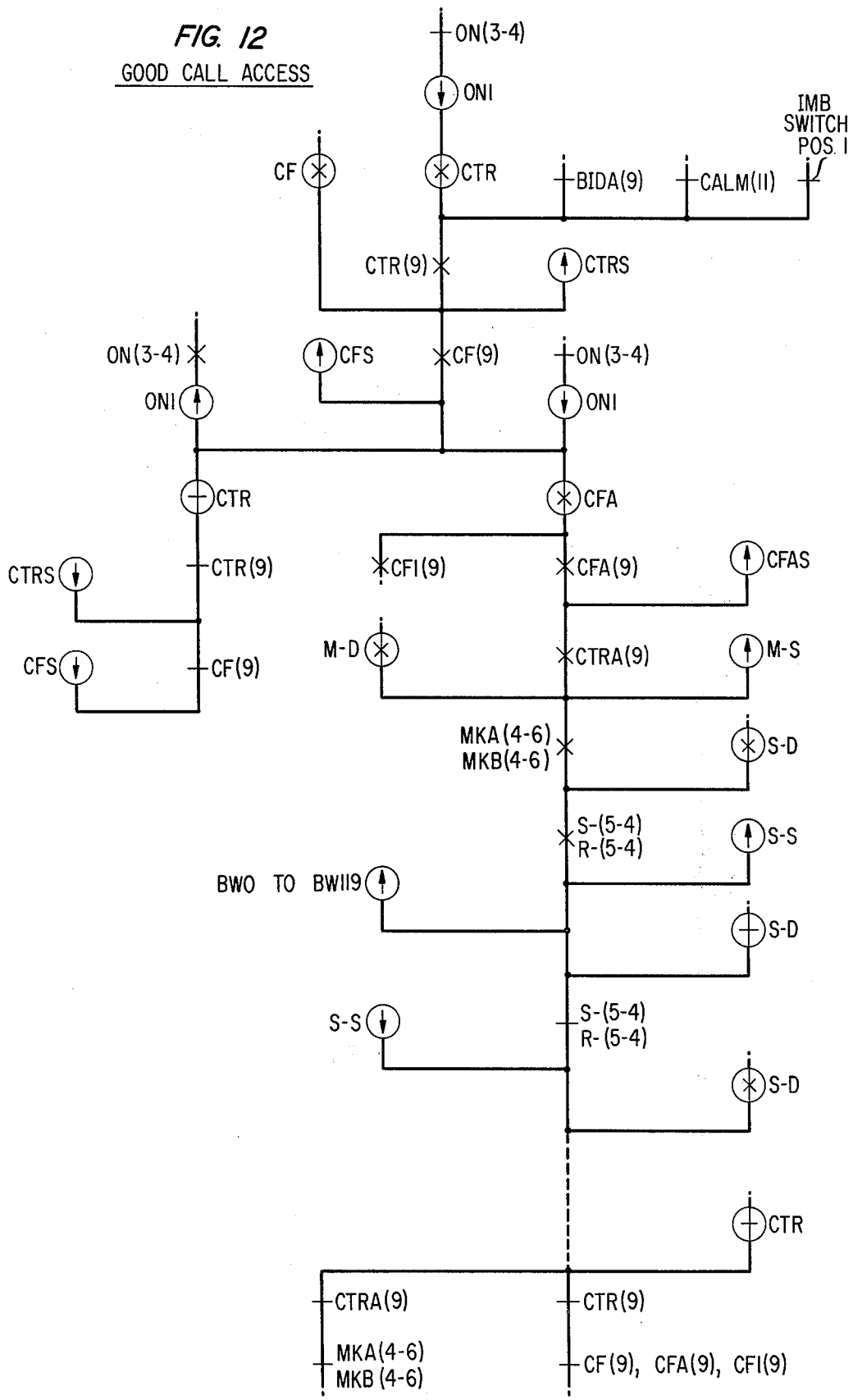
FIG. 12 is a sequence chart illustrating the circuit action of the embodiment involved when the Computer of FIG. 1 effects a special seizure of the Test Frame Connector of FIG. 1.
Figure 13:
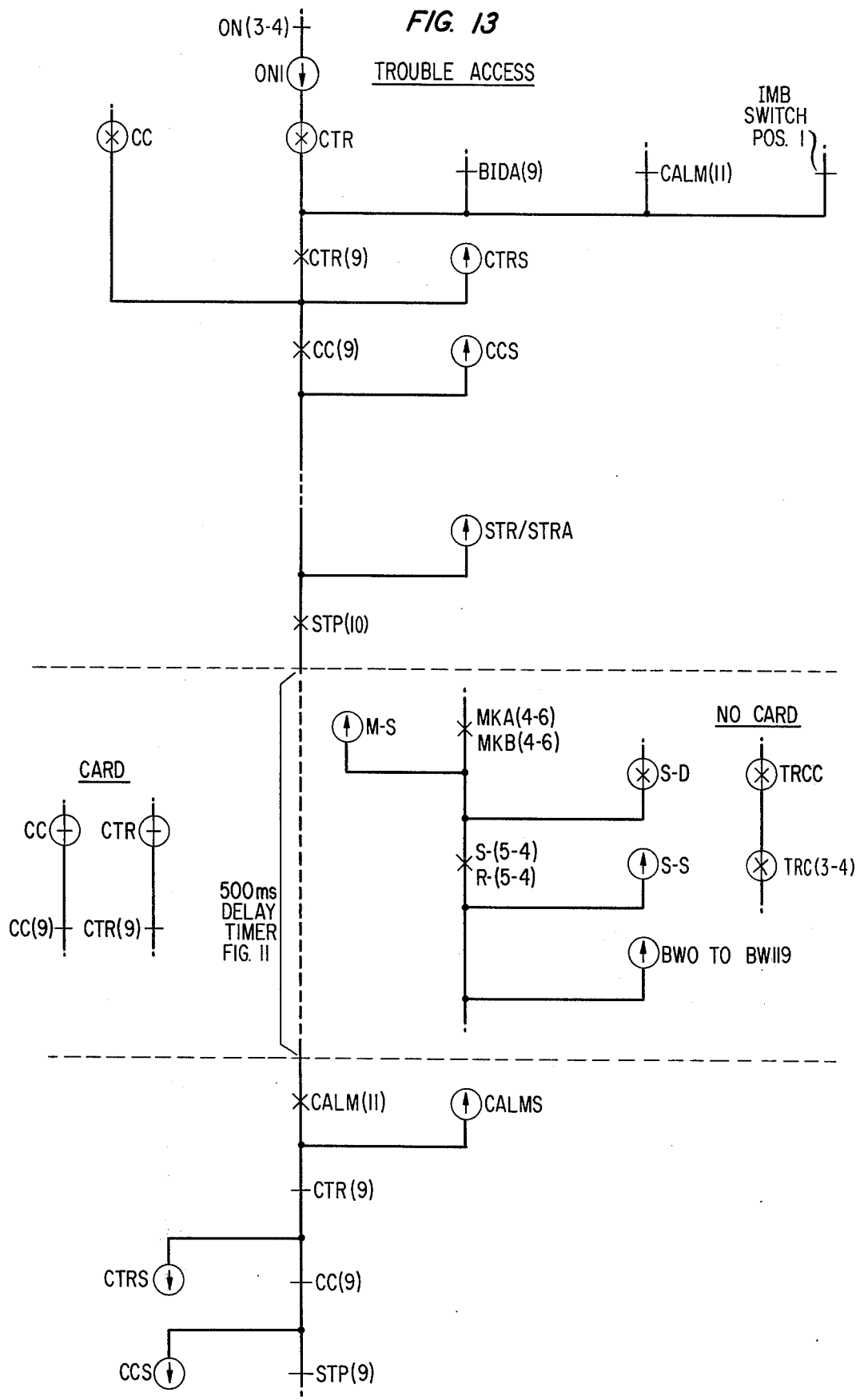
FIG. 13 is a sequence chart illustrating the circuit action of the embodiment involved when the Computer of FIG. 1 intercepts a normal Test Frame Connector seizure by a Marker in FIG. 1; and, FIG. 14 is a sequence chart illustrating the circuit action of the embodiment involved when the Interface of FIG. 1 detects a normal Test Frame Connector seizure attempt, while a special seizure attempt is being served.
Figure 14:
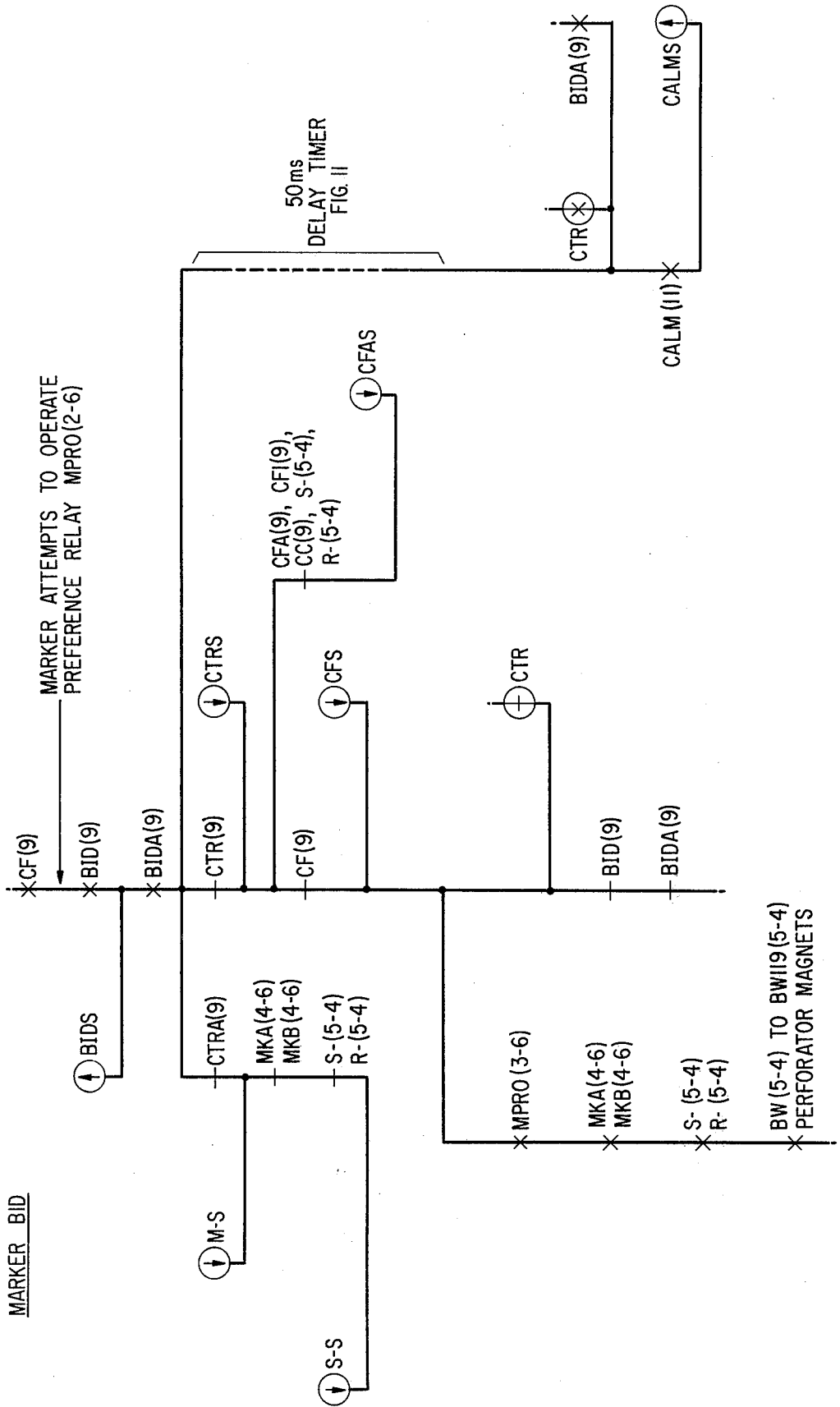

In FIGS. 12 through 14, the charts signify sequences of circuit operations. A minus sign without a circle signifies the release of a relay or of a switch; an X without a circle signifies the operation of a relay or of a switch; a vertical arrow pointed upward inside of a circle signifies a grounded computer scan point; a vertical arrow pointed downward inside of a circle signifies an ungrounded computer scan point; a minus sign inside of a circle signifies an ungrounded computer distribute point; and, an X inside of a circle signifies a grounded computer distribute point.

Dashed lines signify either a repetitive pattern or missing circuitry of no particular significance. For instance in FIG. 3, the dashed lines between relays MPRO(3-6) and MPRI(3-6) and between relays MPRI(3-6) and MPRL(3-6) indicate that a number of other similar relays exist therebetween and arranged in an obvious manner. The dashed line between transfer contact pairs MPRO(3-6)3-4 and MPRI(3-6)3-4 in FIG. 3 indicates the presence of similar circuitry not considered necessary of detailed showing. In FIG. 7, the dashed line connecting resistance battery to the pair of make contacts TST(X-5)(-) and TRSA(7-5)(-) signifies undisclosed circuitry of no particular significance insofar as the present disclosure is concerned.

The box in FIG. 11 designated "TIMER CIRCUIT" is a well-known transistorized timer which, when connected as shown in FIG. 11, functions as follows. The timer is normal when its terminal 11 is grounded; under the normal condition, capacitor C is charged at terminal 4 to a little less than the negative supply; and, terminal 10 is at approximately ground potential, thus leaving relay CALM(11) released. Whenever terminal 11 is ungrounded, such as by either the opening of break contact BIDA(9)9 or the opening of both of break contacts CC(9)8 and STP(10)11, the measurement of a time delay period is started with negative potential supplied to terminal 1 through at least one of the closed make contacts BIDA(9)11 and CFA(9)2 and CC(9)7 and with terminal 4 returned to ground either through resistor R1 and one of the closed make contacts BIDA(9)12 and CFA(9)1 or through resistor R2 and the closed make contact CC(9)12. For instance, the measurement of a time delay is started either if relay BIDA(9) is operated or if relays CC(9) and STP(10) are both operated. When one of these conditions occurs, terminal 11 is driven to about the full negative potential and terminal 4 is driven to about double the full negative potential and the charge in capacitor C begins to discharge to ground through either resistor R1 or resistor R2. After a discharge time determined primarily by either resistor R1 or resistor R2, terminal 4 will have approached approximately to full negative potential, whereupon the timer is energized so that terminal 10 is approximately full negative potential to cause the operation of relay CALM(11). Relay CALM(11) operates in a circuit extending from full negative potential at terminal 10, through the break contact of contact pair CALM(11)4, through the winding of relay CALM(11), to ground through resistor CALM 1. Relay CALM(11) locks operated over the make contact of contact pair CALM (11)4 to negative potential through the AR SWITCH in position 1. Relay CALM(11) will remain operated until the AR SWITCH is opened. If terminal 11 is reconnected to ground before time-out occurs to operate relay CALM(11), the timer action is stopped and capacitor C is returned to its normal condition. Resistor R1 is chosen to provide a time-out interval of about 50 milliseconds (ms); and, resistor R2 is chosen to provide a time-out interval of about 500 ms.

BLOCK DIAGRAM (FIG. 1)

FIG. 1 shows in block diagram from the main functional blocks of circuitry and equipment representing the exemplary embodiment of the invention. The single-line boxes identify similar parts of Williford; and, the Computer and Interface, shown in double-line boxes, represent circuitry and equipment added to Williford to illustrate the exemplary embodiment of the invention.

As fully understood from Williford, the markers compete with the master test circuit and with the automatic monitor to seize the test frame connector. Normal marker seizure of the test frame connector is usually effected under a marker trouble condition for the purpose of causing the trouble recorder to punch a trouble card for later analysis by a maintenance person. The interface is provided to enable the computer to have access to the test frame connector under circumstances such as not to interfere with the normal connector seizure capability of, for instance, the markers.

In one of its modes of operation, the computer may effect a special seizure of the connector, if the connector is idle and available for seizure, in order to use the connector and the trouble recorder facilities to collect from a marker such data as may be registered therein related to marker call handling which represents a good call rather than a trouble call. Such a special seizure of the connector is arranged by the interface so that the special seizure will be relinquished if the interface detects a normal seizure attempt by one of the usual service circuits (e.g., markers, automatic monitor, master test circuit, et cetera): the ability to cause such a special computer seizure to be relinquished renders the special seizure transparent to any normal seizure attempt by a service circuit.

In another of its modes of operation, the computer may monitor the connector to detect any normal trouble seizure. In this mode, the interface permits the computer to intercept such an attempt to seize the trouble recorder facilities and permits the computer to monitor the trouble data which otherwise would control the trouble card perforators. In this latter situation, the computer either can completely supplant the marking of a trouble card by collecting part or all of the trouble data in memory, or can at any time allow the trouble recorder to assume its usual task of effecting a trouble card, or can do both if desired.

Since the details of Williford are well known, the present disclosure is limited to description of only those aspects of Williford which are necessary to an understanding of the above uses of the interface and of the computer.

COMPUTER (FIG. 8)

No details are shown in FIG. 8 regarding the computer of FIG. 1, other than to indicate a processor complex for controlling sets of distribute and scan points. It is quite well known in the art for a suitably programmed general purpose digital computer, or for a special purpose computer for that matter, to perform the relatively simple operations involved herein. It is well known for a processor complex to be able to monitor any particular scan point to ascertain, for instance, whether the scan point is grounded or ungrounded. Also, it is quite well known for a processor complex to be able to control any particular distribute point (e.g., by a latch arrangement) so that the distribute point is caused to be grounded or ungrounded. Insofar as an understanding of the exemplary embodiment of the invention is concerned, it is necessary to understand only that such distribute point and scan point control is to be accomplished as described herein.

FUNCTIONAL DIAGRAM (FIG. 2)

FIG. 2 is a highly skeletonized showing of only a few details of the exemplary embodiment in order to highlight the utility of the arrangement. The showing of FIG. 2 and the following discussion thereof are not intended to cast any limitation on the scope of the present invention but are intended only as an aid in understanding the utility of that invention.

The test frame connector includes a preference relay chain including a preference relay for each service circuit, such as relay MON for the automatic monitor, relay MTP for the master test circuit, relay MPRO for the first marker, relay MPRI for an intermediate marker, and relay MPRL for the last marker. It is understood, of course, that a number of other relays (not shown) for other markers may exist in circuit between relays MPRO and MPRI and in circuit between relays MPRI and MPRL. The preference relay chain is arranged with the relays and their contacts interconnected with each other so that a preference relay of higher preference (e.g., relay MPRL) can normally operate even though a preference relay of lower preference (e.g., relay MPRI) is also operated. In the preference relay chain shown, relay MON has the lowest assigned preference and relay MPRL has the highest assigned preference.

An attempt by a service circuit, such as the first marker, to effect a normal seizure of the connector is manifested by a circuit extending from resistance battery in the first marker, over lead 500, through the winding of preference relay MPRO, over the chain of back contacts of the preference relays of higher assigned preference, such as relays MPRI and MPRL, and to ground in the interface over the back contact of the contact pair CF. Relay MPRO will operate in this circuit and will lock operated to ground over the make contact of its contact pair MPRO, thus breaking the back contact ground chain to the preference relays of lower assigned preference, such as relays MTP and MON. The operation of preference relay MPRO amounts to recognition by the connector of a normal seizure attempt by the first marker. Of course, the concurrent operation of any other preference relay is also a recognition by the connector of such other normal seizure attempt.

In the lower part of the connector in FIG. 2 is shown another chain of preference relay contacts by means of which the connector permits only one normal seizure at a time. It will be seen that the latter contact chain reverses the preference assigned to the preference relays such that the contacts of relay MON are of the highest assigned preference and such that the contacts of relay MPRL are of the lowest assigned preference. As is well known in such arrangements, the reversal of preference allows the unique selection for service of a single one of the recognized seizure attempts.

In the connector of FIG. 2, the relays MKA and MKB are connector relays individual to the first marker. These two relays may represent as many separate relays as are necessary. Of course, each of the other service circuits has its own set of connector relays, which are not shown. Assuming that relays MON and MTP are released, ground will extend over the back contacts of the contact pairs MON and MTP, lead 400, make contact of the contact pair MPRO, lead 600 into the first marker, and eventually over leads 502 and 501 to operate connector relays MKA and MKB for the first marker to effect actual normal connector seizure by the first marker.

Pursuant to normal seizure of the connector by the first marker, a number of circuit functions occur which are of no significance at the moment. Among such circuit functions is the operation of the off-normal relay ON of the connector, the operation of which signifies that the connector is busy and not available for seizure: under these conditions, the right side of the winding of relay ON will be grounded. Whenever the first marker is finished with its use of the connector, the locking circuit for its preference relay MPRO is opened to release relay MPRO, to release connector relays MKA and MKB, and to return the connector to a condition whereunder another recognized normal seizure can effect another normal connector seizure.

In FIG. 2 is shown the computer with a few of its scan and distribute points. Also, a double-line box is shown marked "MANUAL", which is shown so as to manually simulate the automatic functions of the computer. The switch S1 may be closed (shown in open position) to connect the five lamps to the five computer scan points. This permits any of the five lamps CTR, ROS, ON1, CFS, and BIDS to light if any corresponding scan point is grounded. Similarly, any of the four switches CTR, CF, MKBO, and MKAO may either be closed or be opened to simulate the grounding or ungrounding of a corresponding computer distribute point. It will be understood, in the immediately following description, that description of the manual switch functions and of the observation of the condition of the lamps is merely a convenient way of illustrating the distribute point control function and the scan point monitoring function of the computer.

Let it be assumed that the connector is idle and available to be seized (i.e., relay ON is released and the right side of its winding is ungrounded) and that switch S1 is closed. Lamp ON1 will be off (i.e., extinguished) as will the other lamps CTR, CFS, and BIDS. Relay ROS will be operated or not depending upon whether the trouble recorder is out-of-service or is in-service. The condition of relay ROS and of lamp ROS is of no significance to the present description.

If, as assumed, lamp ON1 is out, the CTR and CF switches may be closed as an attempt to effect a special seizure of the connector. The closure of switch CTR causes the operation of relay CTR in a circuit extending from ground, through the closed switch CTR, over the back contact of the contact pair BIDA, and to battery through the winding of relay CTR. The operation of relay CTR completes a circuit over its make contact CTR to cause the operation of relay CF from the closed switch CF. The operation of relay CF amounts to a registration of the special seizure attempt.

The above registration of the special seizure attempt (i.e., the operation of relay CF) is independent of the test frame connector circuitry. In this regard, the switch CF either may be operated at the same time as the operation of switch CTR, as above, or may be operated in response to lamp CTR coming on with the operation of relay CTR. In either case, with relays CTR and CF operated, both of the lamps CTR and CFS will be on, each being controlled in obvious fashion by make contacts of the corresponding relays CTR and CF.

Upon the operation of relay CF, the connector preference relay chain ground return is opened at the break contact of the contact pair CF; and, the ground return is replaced by the series circuit of relay BID and a resistor. The presence of the current limiting impedance represented by relay BID and the resistor causes the amount of current flow through any of the preference relays (due to any normal connector seizure attempt) to be reduced to an amount below the minimum amount necessary to operate any preference relay. However, the relay BID is a sensitive relay which can operate on such a reduced amount of current so as to detect a normal seizure attempt.

Assuming that relay BID does not operate to detect a normal seizure attempt, lamp BIDS will remain out and switches MKAO and MKBO may be operated (assuming that the ON1 lamp is still extinguished) to cause the operation of connector relays, such as MKB and MKA, to effect the special seizure of the connector. When it is desired to release the special seizure, it is merely necessary to open switches MKBO, MKAO, CF, and CTR so that the interface returns to its normal condition.

As long as relay CF is operated to signify a registration of the special seizure attempt, relay BID can operate at any time to detect a normal seizure attempt. The operation of relay BID causes the obvious operation of relay BIDA and the lighting of lamp BIDS. The operated relay BIDA causes the release of relay CTR which releases relay CF, thus to extinguish lamps CTR and CFS and to remove the registration of the special seizure attempt. When the lamp BIDS goes on, as above, any operated switch (e.g., MKBO, MKAO, CF, or CTR) will be opened, thus causing the interface to return to normal. This return to normal, in addition to causing the release of all operated ones of relays CTR, CF, BID, and BIDA, readjusts the ground return for the connector preference relays so that a normal seizure attempt can be recognized. Also, part of the return of the interface to normal is the release of relay CF, which amounts to a removal of the registration of the special seizure attempt.

It will be apparent that the suitably programmed computer of FIG. 2 may automatically perform its scan point monitoring and distribute point control in the same fashion as the above-described manual observation of the lamps and control of the switches.

MARKER TROUBLE SEIZURE

It is considered helpful to describe the essence of a normal trouble seizure of the test frame connector prior to describing how a special seizure is effected by the computer. In this regard it will be assumed (1) that switch SW shown in FIGS. 3 through 6 is set to its position 2 so as to disconnect the interface of FIGS. 9 through 11 and (2) that the interface make-busy IMB SWITCH of FIGS. 9 and 11 is set to its position 2 so as to signify that the interface of FIGS. 9 through 11 is out-of-service (i.e., is made busy). In the latter regard, in FIG. 11, ground is supplied over position 2 of the IBM SWITCH to lead IMBS extending into FIG. 8 to the computer IMBS scan point to inform the computer that the interface is out-of-service.

All of this description of a normal marker trouble seizure of the test frame connector, along with considerably more, is fully set forth in Williford.

In FIG. 7, if the marker runs into trouble, such as a delay timer becoming energized due to too much delay in the marker functioning, a relay WT (not shown) operates followed by the operation of another relay TRT (not shown) so as to cause the operation of relay TRI(7-5) in a circuit extending from ground, over make contacts TRT(X-5)2 and WT(X-5)2, extending eventually to lead 503, through break contact TRR(X-5)3 of a relay TRR (not shown), and to battery through the winding of relay TRI(7-5). The operation of relay TRI(7-5) causes the operation of relay TRST(7-5) in a circuit extending from ground, over make contact TRI(7-5)3, over break contact MON1(X-5)1 of a relay MON1 (not shown), and to battery through the winding of relay TRST(7-5). The operation of relay TRST(7-5) causes the operation of relay TRSA(7-5) in an obvious circuit over make contact TRST(7-5)1.

A start circuit is then completed as an attempt by the marker to effect a normal seizure of the test frame connector. This circuit extends from battery in FIG. 7, through a resistor, eventually over make contact TRSA(7-5)(-), over break contact TRB(X-5)3 of a relay TRB (not shown), lead 500 into the connector of FIG. 3, and through the winding of the marker preference relay MPRO(3-6) to the lower side of the winding of relay MPRO(3-6). This attempt to operate relay MPRO(3-6) will succeed only if, as will be obvious in FIG. 3, (1) either or both of the relays MTP(3-4) and MON(3-4) of lower assigned preference is or are operated, (2) or all of the relays MPRI(3-6) and MPRL(3-6) et cetera of higher assigned preference are released, or (3) both of situations (1) and (2) prevail. It will be assumed, for purposes of discussion, that none of these other preference relays is operated, so relay MPRO(3-6) will operate to ground at position 2 of switch SW over a chain of back contacts including back contacts of the contact pairs MPRI(3-6)3-4 and MPRL(3-6)3-4 et cetera. The operation of relay MPRO(3-6), which locks to ground over the make contact of contact pair MPRO(3-6)3-4, amounts to recognition by the connector of the normal seizure attempt by the marker.

Figure 4:
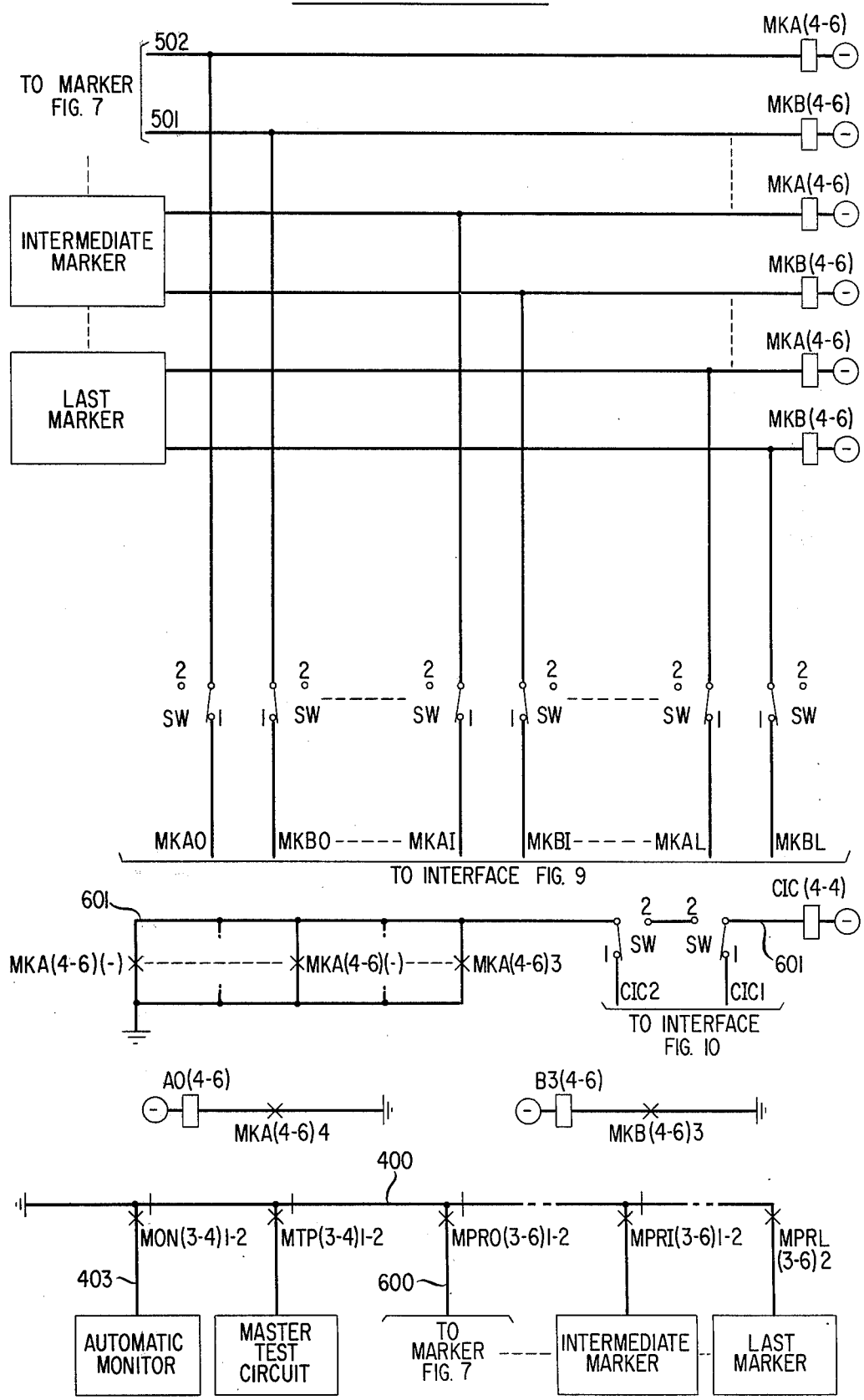

Upon the operation of preference relay MPRO(3-6), with all other preference relays of FIG. 3 released, a circuit is completed for operating the marker connector relays MKA(4-6) and MKB(4-6) of the test frame connector in FIG. 4. This circuit extends from ground in FIG. 4, over the break contacts of the contact pairs MON(3-4)1-2 and MTP(3-4)1-2, lead 400, the make contact of the contact pair MPRO(3-6)1-2, and over lead 600 into the marker in FIG. 7. In FIG. 7, lead 600 extends over make contact TRST(7-5)3 to lead 501 into FIG. 4; and lead 600 also extends in FIG. 7 over make contact TRST(7-5)2 and break contact TRB(X-5)2 to lead 502 into FIG. 4. In FIG. 4, leads 501 and 502 from FIG. 7 extend to battery through the windings of the upper two marker connector relays MKB(4-6) and MKA(4-6) individual to the marker in question. The operation of these two connector relays MKA(4-6) and MKB(4-6) manifests an actual normal seizure by the marker of the test frame connector and these operated connector relays cause the operation in FIG. 4 of the auxiliary connector relays AO(4-6) and B3(4-6) over respective make contacts MKA(4-6)4 and MKB(4-6)3.

As explained more fully in Williford, relays AO(4-6) and B3(4-6) represent a number of such connector relays for extending a large number of leads from the marker to and through the test frame connector so that trouble data can be recorded by the trouble recorder.

The operation of connector relay MKA(4-6) also causes the operation of relay CIC(4-4) in an obvious circuit in FIG. 4 over make contact MKA(4-6)3, lead 601, positions 2 of switch SW, lead 601, and to battery through the winding of relay CIC(4-4). A circuit is now complete for operating the start relay STR(6-1) in the trouble recorder of FIG. 6, the circuit extending from ground in FIG. 3, over make contact CIC(4-4)3, lead 401, make contacts MKB(4-6)1 and MKA(4-6)5, lead 603, the break contact of contact pair TRC(3-4)5-6, break contact TRC2(X-4)1, the break contact of the contact pair MON(3-4)5-6, lead 402, position 2 of switch SW, lead 402 into FIG. 6, over position 2 of switch SW, lead 402, and to battery through the winding of the trouble recorder start relay STR(6-1). Also, upon the operation of relay CIC(4-4), a circuit is completed in FIG. 3 for operating the connector off-normal relay ON(3-4) in an obvious circuit from ground over make contact CIC(4-4)2 and positions 2 of switch SW.

In FIG. 6, relay STR(6-1), in operating, extends its operating ground over make contact STR(6-1)4 and over lead 100 to the winding of relay TS(6-2) to cause the operation of relay TS(6-2). Eventually, a relay ST (not shown) is operated so that ground extends in FIG. 6, over make contact ST(X-2)1, lead 204, position 2 of switch SW, lead 204 into FIG. 3, position 2 of switch SW, and lead 204 to help hold operated the off-normal relay ON(3-4).

Eventually in FIG. 5, the circuitry of the trouble recorder closes a ground onto lead 203 to cause the operation of the pair of relays SO(5-4) and RO(5-4). This pair of relays is one of nine pairs, the ninth pair being shown in FIG. 5 as relays S8(5-4) and R8(5-4). These scan relays are operated and released, one pair at a time, in a prescribed sequence to extend a different group of leads (e.g., 120 leads) from the marker to the trouble recorder to control the perforator magnets BW(5-4) through BW119(5-4) of FIG. 5. In this way, the nine sequences of relay pair operations can cause as many as 1,080 possible trouble card hole punchings in a trouble card.

When the punching of the trouble card is completed, the trouble recorder signals the test frame connector to that effect by operating a relay TRC1 (not shown) in the trouble recorder. The operation of that relay TRC1 extends ground from FIG. 6, over make contact TRC1(X-2)2, over position 2 of switch SW, lead 205 into FIG. 3, over position 2 of switch SW, lead 205, over the break contact of contact pair TRC2(X-4)2-3 of a relay TRC2 (not shown), and to battery through the winding of relay TRC(3-4), which thereupon operates and locks to ground on lead 204 over make contact TRC(3-4)3 and over the make contact of contact pair TRC(3-4)1-2. The operation of relay TRC(3-4) in FIG. 3 is an indication to the test frame connector that the trouble recorder has completed the making of a trouble card.

The operation of relay TRC(3-4) initiates a series of circuit functions, including the operation of the marker relay TRB(X-5), which result in the return to normal of the test fame connector and of the trouble recorder, including the release of the marker preference relay MPRO(3-6), of the marker connector relays MKA(4-6), MKB(4-6), AO(4-6), and B3(4-6), and of the marker relays TRI(7-5), TRST(7-5), TRSA(7-5), and TRB(X-5). Also, relay TRC(3-4) in FIG. 3 is eventually released to signify that the trouble recorder has returned to normal and is again available for use.

With regard to the above brief outline of the trouble recorder functioning, a few additional details are of passing interest. If the trouble recorder is for any reason out-of-service, the relay ROS(5-4) of the test frame connector will be operated in FIG. 5 by ground from the trouble recorder over positions 2 of switch SW. Also, in FIG. 6, when the trouble recorder has been activated for a trouble card punching operation, its off-normal relay ON(6-2) will have been operated from the L1CAM(X-2) of the recorder mechanism; and, relay ON(6-2) will not be released until the trouble recorder is no longer off-normal (i.e., no longer occupied and unavailable).

It will be noted that if switch SW in FIGS. 3 through 6 is set at its position 1 to connect the interface of FIGS. 9 through 11 into the system, instead of being set at its position 2 as above assumed, the previous description of a normal marker seizure of the test frame connector for trouble card production is not altered as long as the computer does not activate the interface. For instance, let it be assumed that switch SW is set to its position 1; but, let it also be assumed that the interface make-busy IBM SWITCH of FIGS. 9 and 11 is set to its position 2 (1) so that the computer sees a grounded scan point IMBS in FIG. 8 indicating that the interface should not be activated and (2) so that the computer cannot operate the interface relay CTR(9) in FIG. 9 from a grounded distribute point CTR in FIG. 8.

Under the above assumed conditions the following circuits are arranged so that normal attempts to seize the test frame connector (as previously described) are not altered: leads ON1 and ON2 from FIG. 3 into FIG. 10 are connected together in FIG. 10 over break contact CF1(9)8; lead OP from FIG. 3 into FIG. 9 extends to ground in FIG. 9 over the break contact of contact pair CF(9)5; lead 402 in FIG. 3 extends over lead STR into FIG. 10, thence over the break contact of contact pair CC(9)11, and over break contacts CF1(9)7 and ROS(10)10 to lead STRP into FIG. 6, and back to lead 402 at the winding of relay STR(6-1); lead 205 in FIG. 3 extends over lead TRCA into FIG. 10, thence over break contact CC(9)3 to lead TRC into FIG. 6, and thence back to lead 205; lead 204 in FIG. 3 extends over lead ONA into FIG. 10, thence over break contact CC(9)4 to lead ON into FIG. 6, and back to lead 204; leads 601 in FIG. 4 extend over leads CIC1 and CIC2 into FIG. 10 where they are joined over break contact CF1(9)1; and, leads ROS and ROS1 in FIG. 5 extend into FIG. 10 where they are joined over break contact CC(9)2. Thus, so long as the interface of FIGS. 9 through 11 is not activated, the normal marker trouble seizure attempt is not altered in any manner. Furthermore, even if the interface make-busy IMB SWITCH of FIGS. 9 and 11 is in position 1, no interference can be exercised over the normal marker seizure situation unless the computer activates the interface as will be described below.

COMPUTER INTERCEPT OF TROUBLE SEIZURE

One mode of operation of the interface and of the computer may be programmed in the computer to cause the computer to intercept a normal marker attempt to produce a trouble record card. In order to describe this mode of operation, it is assumed that switch SW of FIGS. 3 through 6 is in position 1 and that the interface make-busy IMB SWITCH of FIGS. 9 and 11 is in position 1. The sequence chart of FIG. 13 may be consulted as an aid in understanding the sequence of control functions involved in this mode of operation.

Initially, the computer ascertains whether or not the test frame connector is off-normal by looking at the ON1 scan point in FIG. 8. Assuming that scan point ON1 is not grounded, the computer initially grounds distribute points CTR and CC to place ground onto leads CTR and CC into FIG. 9. It is of no consequence at this time to the computer whether or not the trouble recorder is out-of-service. The computer, however, ascertains the trouble recorder status by looking to see whether or not the ROS scan point in FIG. 8 is grounded. If the recorder is out-of-service, relay ROS(10) in FIG. 10 will be operated from ground on lead ROS1 from FIG. 5, the test frame connector relay ROS(5-4) of FIG. 5 will be operated by ground extended thereto on lead ROS from FIG. 10 over break contact CC(9)2 in FIG. 10, and the computer will see a grounded ROS scan point in FIG. 8.

The grounded lead CTR extends from the distribute point in FIG. 8 into FIG. 9, over the break contact of contact pair BIDA(9)8, position 1 of the IMB SWITCH, break contact CALM(11)5, and to battery through the winding of relay CTR(9), thus causing the operation of relay CTR(9), which applies ground in FIG. 9 over make contact CTR(9)13 onto lead CTRS to the CTRS scan point in FIG. 8 as an indication to the computer that relay CTR(9) has operated. Upon the operation of relay CTR(9), the grounded distribute point CC in FIG. 8 extends ground on lead CC into FIG. 9 to operate relay CC(9) over make contact CTR(9)3. The operated relay CC (9) thereupon applies ground over make contact CC(9)9 in FIG. 9 onto lead CCS into FIG. 8 to ground the scan point CCS an an indication to the computer that relay CC(9) has operated.

With relays CTR(9) and CC(9) operated, the interface of FIG. 10 waits to intercept a trouble recorder start condition which, as has been described, will be manifested by a ground on lead STR into FIG. 10 from the test frame connector of FIG. 3. As will be obvious from an inspection of FIG. 3, the trouble recorder start ground will appear on lead STR into FIG. 10 if the automatic monitor preference relay MON(3-4) is released and will appear on lead STRA if relay MON(3-4) is operated. It will be assumed that relay MON(3-4) is released so that the start lead STR in FIG. 10 will carry the start ground. As will be apparent by inspection of FIG. 10, a ground on start lead STRA from FIG. 3 will have the same effect on the interface of FIG. 10: the only difference would be grounded scan point STR of FIG. 8 in one case and a grounded scan point STRA of FIG. 8 in the other case. These scan points STR and STRA are grounded in an obvious manner by the corresponding grounded leads from FIG. 10 into FIG. 8.

In FIG. 10, with relay CC(9) operated, ground on the start lead STR from FIG. 3 is extended over the make contact of the contact pair CC(9)11, through diode D1, and to battery through the winding of relay STP(10), thus operating relay STP(10). As has been described, on FIG. 11 upon the operation of relay STP(10) with relay CC(9) operated, the TIMER CIRCUIT starts timing an interval of about 500 ms: ground is removed from terminal 11 by the opening of break contacts CC(9)8 and STP(10)11; battery is applied to terminal 1 over make contact CC(9)7; and, resistor R2 is connected from terminal 4 to ground over make contact CC(9)12. It will be recalled that unless terminal 11 is regrounded before time-out occurs, relay CALM(11) will operate to lock-out the computer. Thus, in the present instance, the computer will have about 500 ms to perform its functions incident to the interface of FIG. 10 having intercepted the start signal.

In FIGS. 9, 10, and 11, the operation of relays CTR(9), CC(9), and STP(10) leaves the test frame connector circuitry in its normal state except as follows: in FIG. 10, break contact CC(9)2 opens the connection between leads ROS and ROS1 into FIG. 5 to cause relay ROS(5-4) either to release or to remain released since it is of no concern at the moment to the test frame connector whether or not the trouble recorder is out-of-service; and, in FIG. 10, break contacts CC(9)3 and CC(9)4 open the leads ON and TRC from the trouble recorder of FIG. 6 to leads ONA and TRCA into the test frame connector of FIG. 3 so that only the computer of FIG. 8 can control the circuitry of FIG. 3, particularly relay TRC(3-4) as will be described.

The marker trouble seizure will have caused the operation, as previously described, in the connector circuitry of FIGS. 3 and 4 of relays MPRO(3-6), ON(3-4), MKA(4-6), MKB(4-6), AO(4-6), BS(4-6), and CIC(4-4). In FIG. 5, the perforator magnets BW(5-4) through BW119(5-4) and the nine pairs of scan relays SO(5-4), RO(5-4) through SB(5-4), R8(5-4) will not be controlled as previously described since at the moment the trouble recorder circuitry and apparauts has not been activated since the grounded start lead STR from FIG. 3 into FIG. 10 has been intercepted so that such a start ground never arrived at the start relay STR(6-1) of the trouble recorder in FIG. 6.

When the computer sees the grounded scan point MOS in FIG. 8 from FIG. 9, and thence over lead MKAO from FIG. 4, the computer knows that the marker connector relays MKA(4-6) and MKB(4-6) of FIG. 4 have been operated. Thereupon, the computer may cause the grounding in FIG. 8 of any one of the distribute points SOD to S8D, so that over leads SOD to S8B into FIG. 11, and thence over make contacts CTR(9)4 to CTR(9)12, the computer can cause the operation in FIG. 5 (via leads SO to S8 from FIG. 11 into FIG. 5) of one of the scan relay pairs SO(5-4), RO(5-4) to S8(5-4), R8(5-4), the operation of which is indicated to the computer over leads SOS to S8S from FIG. 11 to scan points SOS to S8S in FIG. 8. In this manner, the computer, by its scan points BWO to BW119 in FIG. 8 connected to the perforator leads BW0 to BW119 in FIG. 5, can scan the data carried to those leads in FIG. 5 from the marker over make contacts of the operated relay pair S-(5-4), R-(5-4). The computer can control the relay pairs S-(5-4), R-(5-4) in any desired fashion by selectively grounding and ungrounding the distribute points SOD to S8D one at a time, thus to collect as much or as little data as its programming may require.

It will be assumed that the computer finishes its scanning operation before time-out occurs (about 500 ms) to cause the operation in FIG. 11 of relay CALM(11). The computer programming will allow the computer to decide whether or not to allow the trouble recorder to produce a punched trouble card. If a card is desired, the computer ungrounds its distribute points CC and CTR in FIG. 8 to release relays CC(9) and CTR(9) of FIG. 9. If no card is desired, the computer grounds its TRCC distribute point in FIG. 8, which extends ground over lead TRCC into FIG. 10, over make contact CTR(9)15, lead TRCA into FIG. 3, over position 1 of switch SW, lead 205, over the break contact of contact pair TRC2(X-4)2-3, and to battery through the winding of relay TRC(3-4), which thereupon operates.

If no card is desired, the operation of relay TRC(3-4) in FIG. 3 signifies to the test frame connector that marker release may take place, it being recalled that the normal operation of relay TRC(3-4) results from a signal by the trouble recorder to the test frame connector that the trouble recorder has completed making a trouble card. The release by the marker of the test frame connector takes place as previously described. This releasing operation will cause the release of all operated relays in FIGS. 3 through 7, thus ungrounding all of the scan points in FIG. 8 which were controlled by those operated relays. The computer may then, if not sooner, unground its distribute points CTR and CC in FIG. 8 to release relays CTR(9) and CC(9), thus to recycle the TIMER CIRCUIT of FIG. 11 and to return the interface of FIGS. 9 through 11 to its normal condition.

If a card is desired, the release of relays CC(9) and CIR(9) in FIG. 9, in addition to ungrounding scan points CCS and CTRS in FIG. 8, returns to normal the entire interface of FIGS. 9 through 11 including the release of relay STP(10) and the recycling of the TIMER CIRCUIT of FIG. 11. Upon the release of relay CC(9), a still existing trouble recorder start ground, on lead STR into FIG. 10 from FIG. 3, will be extended as previously described to lead STRP from FIG. 10 into FIG. 6 to cause the operation of the trouble recorder start relay STR(6-1) to cause the making of a trouble card as has been described.

As has been described, if at any time the TIMER CIRCUIT of FIG. 11 should time-out to operate relay CALM(11), the computer will be locked-out until the alarm release AR SWITCH in FIG. 11 is opened to release relay CALM(11), to unground scan point CALMS in FIG. 8, and to extinguish the lamp CALM in FIG. 11.

COMPUTER SEIZURE — NO MARKER BID

The sequence chart of FIG. 12 illustrates the circuit and computer functions which take place during that computer mode whereunder the computer effects special seizure of the test frame connector in order to collect data from a marker which is handling a call not involving trouble (i.e., a good call).

If the computer sees an ungrounded scan point ON1 in FIG. 8, indicating that the off-normal relay ON(3-4) is released and that the test frame connector is available to be seized, the computer may ground its distribute points CF and CTR in FIG. 8. With distribute point CTR grounded, the ground extends on lead CTR from FIG. 8 into FIG. 9 to cause the operation of relay CTR(9) provided that relays BIDA(9) and CALM(11) are released and provided that the IMB SWITCH in FIG. 9 is set on its contact 1, all as previously described. The operated relay CTR(9) grounds scan point CTRS in FIG. 8 and causes relay CF(9) to operate in a circuit extending from the grounded distribute point CF in FIG. 8, over lead CF into FIG. 9, over make contact CTR(9)2, and to battery through the winding of relay CF(9), which thereupon extends ground from FIG. 9 over the make contact of contact pair CF(9)5 to lead CFS into FIG. 8 to ground the computer scan point CFS.

When relay CF(9) operates, the back contact of contact pair CF(9)5 in FIG. 9 removes the direct ground from lead OP extending from FIG. 9 into FIG. 3 and inserts in place of that direct ground the series circuit in FIG. 9 of relay BID(9) and a resistor. It will be seen from FIGS. 3 and 9 that the ground return on lead OP for the preference relays MON(3-4) through MPRL(3-6) of FIG. 3 is thus replaced with a resistor and relay BID(9) in FIG. 9 so that any current flow attempting to operate a preference relay must also flow through relay BID(9) and its associated resistor in FIG. 9.

The operation of relay CF(9) represents a registration in the interface of FIGS. 9 through 11 of an attempt by the computer to effect special seizure of the connector; and, that registration is independent of he preference-connector seizure circuits of the test frame connector of FIGS. 3 through 5. As long as relay CF(9) is operated so as to register therein the special seizure attempt, the current limiting impedance represented by relay BID(9) and its associated resistor will remain in series with any preference relay which attempted to be operated in FIG. 3. This impedance is sufficient to reduce the current flow in any preference relay such that the preference relay cannot operate to recognize a normal seizure attempt even though a service circuit, such as the marker of FIG. 7, may attempt to do so as has been described. However, the relay BID(9) is a sensitive relay so arranged as to be operative in response to the reduced current so that relay BID(9) may operate to detect any normal seizure attempt.

It will be assumed for the rest of this subsection description that no normal seizure attempt is detected by relay BID(9) while the special seizure by the computer is being served. The effect of an operation of relay BID(9) will be described in the next subsection.

The computer will again look at the test frame connector off-normal scan point ON1 in FIG. 8 to be sure that the test frame connector has not been activated. If the computer finds a grounded scan point ON1, the computer will unground its CTR and CF distribute points in FIG. 8 to cause the release in FIG. 9 of relays CTR and CF, to in turn return the interface of FIGS. 9 through 11 to its normal state. If, on the other hand, as will be assumed at this point, the computer finds the ON1 scan point still ungrounded, the computer may proceed as described below to use the test frame connector to collect marker data on whatever good call may be in the process of being handled by the marker.

The computer grounds its CFA distribute point in FIG. 8, causing ground to extend on lead CFA from FIG. 8 into FIG. 9, over make contact CTR(9)1, and to battery through the windings in parallel of relays CFA(9) and CF1(9), which thereupon operate. The operation of relay CFA(9) applies ground in FIG. 9, over make contact CFA(9)3, to lead CFAS into FIG. 8 to ground computer scan point CFAS. Also, in FIG. 9, the operation of relay CFA(9) extends ground from the left side of the winding of relay CTR(9), over make contact CFA(9)5, to battery through the winding of relay CTRA(9) to cause the operation of relay CTRA(9).

The following circuit conditions now prevail due to the operation of relays CTR(9), CF(9), CFA(9), CF1(9), and CTRA(9); the computer distributes points MOD through MLD of FIG. 8 are connected over leads MOD through MLD into FIG. 9, thence over make contacts CTRA(9)(-) to the pairs of leads MKAO, MKBO through MKAL, MKBL extending into FIG. 4, whereby the computer may operate any desired pair of connected relays MKA(4-6), MKB(4-6) for any desired marker; in FIG. 10, break contact CF1(9)8 opens the connection between leads ON1 and ON2 into FIG. 3 so that the test frame connector off-normal relay ON(3-4) cannot be operated unless and until relay CF1(9) is released; in FIG. 10, break contact CF1(9)1 likewise opens the connections between leads CIC2 and CIC1 into FIG. 4 so that relay CIC(4-4) is prevented from being operated unless and until relay CF1(9) is released; in FIG. 10, break contacts CF1(9)7 and CF1(9)6 open the connection in FIG. 10 between the pairs of leads STR, STRP and STRA, STRAP of FIGS. 3 and 6 so that the trouble recorder circuitry and equipment cannot be activated until and unless relay CF1(9) is released; and, in FIG. 9, as above discussed, the break contact of the contact pair CF(9)5 renders relay BID(9) and its associated resistor effective to detect any normal attempt to seize the test frame connector (by an attempt to operate a preference relay of FIG. 3) while preventing the operation of any preference relay of FIG. 3.

The computer may at this point ground one of its distribute points MOD through MLD of FIG. 8 so as to operate a pair of marker connector relays, such as connector relays MKA(4-6) and MKB(4-6) of FIG. 4. The operation of a pair of relays MKA(4-6) and MKB(4-6) will ground the corresponding scan point MOS through MLS in FIG. 8 as an indication to the computer that the desired marker connector relays, and their auxiliary relays such as relays AO(4-6) or B3(4-6) of FIG. 4, have been operated. At this point the computer may operate any desired pair of scan relays S-(5-4), R-(5-4) of FIG. 5 (by grounding the desired distribute point S-D of FIG. 8) so as to select those marker data points which are desired to be scanned. The computer scan points BWO to BW119 of FIG. 8, as previously described, allow the computer to scan up to 120 separate leads for the pair of operated scan relays S-(5-4), R-(5-4), as shown in FIG. 5.

The computer may thereafter release the operated pair of scan relays, operate another pair, scan the additional data, release the operated pair, operate another pair, et cetera, as long as it is desired to scan data. When the computer has completed its prescribed data scanning, it will unground all of its grounded distribute points to allow the entire circuitry to return to normal, including of course the release of relay CF(9) so that the preference relay chain of FIG. 3 may once again recognize a normal seizure attempt.

COMPUTER SEIZURE —MARKER BID

As illustrated in the chart of FIG. 14, at any time while relay CF(9) is operated in FIG. 9 (to signify registration of a special attempt by the computer to seize the test frame connector), if relay BID(9) operates in FIG. 9 to detect an attempt by a service circuit to operate a preference relay of FIG. 3 so as to effect a normal seizure of the test frame connector, the operated relay BID(9) causes the operation in FIG. 9 of relay BIDA(9) in an obvious manner over make contact BID(9)5 and causes the computer scan point BIDS of FIG. 8 to be grounded over lead BIDS from FIG. 9.

The operation of relay BIDA(9) causes the TIMER CIRCUIT of FIG. 11 to start timing for about 50 milliseconds as previously described, so that relay CALM(11) will be operated to lock-out the computer in the event that the interface of FIGS. 9 through 11 is not returned to normal within that 50 milliseconds.

The operation of relay BIDA(9) releases relays CTR(9) and CTRA(9) of FIG. 9 and the release of relay CTR(9) releases relays CF(9), CFA(9), and CFI(9) of FIG. 9. The release of relay CTRA(9) will release any operated marker connector relays of FIG. 4, such as relays MKA(4-6), MKB(4-6), A0(4-6), and B3(4-6). The release of the other relays returns to normal all of the circuitry of the interface of FIGS. 9 through 11 so that any normal seizure attempt can be recognized. The latter function is enabled particularly by the release of relay CF(9) so that the preference relay chain ground return lead OP in FIG. 3 is again connected directly to ground over the break contact of the contact pair CF(9)5 in FIG. 9. The release of relay CF(9) amounts to the removal of the computer special seizure attempt.

When the computer sees a grounded scan point BIDS in FIG. 8, the computer should unground all of its grounded distribute points in order to assist the release of all circuitry to normal. Distribute point CTR is of particular concern since unless the distribute point is ungrounded, relay BIDA(9) will remain operated in FIG. 9 from ground on lead CTR from FIG. 8 into FIG. 9, and to the winding of relay BIDA(9) over the make contact of contact pair BIDA(9)8. The continued operation of relay BIDA(9), due to an erroneously continued ground on lead CTR in FIG. 9 from FIG. 8, will cause no particular difficulty and will not have any undesirable effect on the above-described return to normal of the rest of the circuitry. However, the continued operation of relay BIDA(9), as has been described in connection with FIG. 11, will cause the TIMER CIRCUIT to time out to cause the operation of relay CALM(11), which as shown in FIG. 11 will extend ground over make contact CALM(11)1 to light the CALM lamp and to ground the computer scan point CALMS (via lead CALMS from FIG. 11 into FIG. 8) in FIG. 8. This situation represents a locking-out of the computer, including the ungrounding of the CTR scan point to release relay BIDA(9). The computer cannot again exercise control over the interface until a maintenance person opens the AR SWITCH in FIG. 11 to allow relay CALM(11) to release.

It is to be understood that the above-described arrangement is illustrative of the application of the principles of the invention. Other arrangements may be devised by those skilled in the art without departing from the spirit and scope of the invention. For instance, it will be quite apparent, irrespective of the particular means used herein as illustrative, that the invention in its broader sense is not at all concerned with and is not limited by the nature of the source of any seizure attempt. Furthermore, in its narrower sense, the invention is not necessarily limited to any particular kind or variety of service circuit for producing normal seizure attempts. Also, it will be seen, in the exemplary embodiment, that the time interval for allowing recognition of a normal seizure attempt incident to detection thereof during a special seizure situation is determined only by inherent circuit response delay; however, it will be obvious that such a time interval may be as short or as long as desired under particular circumstances and that such a time interval may be determined either by circuit design or by equipment design or by computer programming or by any desired combination thereof depending upon the particular embodiment in question.

What is claimed is:

1. An arrangement for controlling seizure of a connector, wherein a connector seizure circuit is provided for recognizing an attempt to effect normal seizure of the connector, and wherein the seizure circuit is responsive to a recognized normal seizure attempt to permit normal seizure, the arrangement comprising:
   A. means independent of the seizure circuit for registering an attempt to effect special seizure of the connector;
   B. special means rendered effective by the registering means, while a special seizure attempt is registered therein, for detecting a normal seizure attempt while preventing recognition thereof by the seizure circuit;
   C. and, means controlled by the effective special means, incident to detection of a normal seizure attempt, to remove the registration from the registering means so as to allow normal seizure attempt recognition by the seizure circuit.

2. The invention defined in claim 1
   A. wherein the seizure circuit comprises means normally enabled so as to recognize a normal seizure attempt
   B. and wherein the effective special means comprises means for disabling the normally enabled means.

3. The invention defined in claim 2
   A. wherein the normally enabled means comprises
      1. a normal current responsive device operable by the flow therethrough of an electrical current equal to or more than a specified amount
      2. and means normally rendered effective by a normal seizure attempt to produce at least the specified amount of current flow through the normal device so that the normal device operates to recognize the normal seizure attempt
   B. and wherein the disabling means comprises means for reducing the amount of current flow through the normal device to an amount less than the specified amount.

4. The invention defined in claim 3 wherein the reducing means comprises current limiting impedance added to the normal device in series relation to the flow of current.

5. The invention defined in claim 4 wherein the impedance comprises a sensitive current responsive device operable by the flow therethrough of the reduced amount of current so as to detect a normal seizure attempt.

6. The invention defined in claim 5 wherein the removing means is controlled by the operation of the sensitive device.

7. An arrangement for controlling seizure of a connector, wherein a connector seizure circuit is provided for recognizing at least one attempt by one or more of a plurality of service circuits to effect normal seizure of the connector, and wherein the seizure circuit is responsive to one or more recognized normal seizure attempts to permit one normal seizure at a time, the arrangement comprising:
   A. means independent of the seizure circuit for registering an attempt to effect special seizure of the connector;
   B. special means rendered effective by the registering means, while a special seizure attempt is registered therein, for detecting a normal seizure attempt while preventing recognition thereof by the seizure circuit;
   C. and, means controlled by the effective special means, incident to detection of a normal seizure attempt, for removing the registration from the registering means so as to allow normal seizure attempt recognition by the seizure circuit.

8. The invention defined in claim 7
   A. wherein the seizure circuit comprises means normally enabled so as to recognize at least one normal seizure attempt
   B. and wherein the effective means comprises means for disabling the normally enabled means.

9. The invention defined in claim 8
   A. wherein the normally enabled means comprises
      1. a normal current responsive device individual to each service circuit and operable by the flow therethrough of an electrical current equal to or more than a specified amount
      2. and means normally rendered effective by at least one normal seizure attempt to produce at least the specified amount of current flow through at least one normal device so that at least one normal device operates to recognize at least one normal seizure attempt
   B. and wherein the disabling means comprises means for reducing the amount of current flow through any normal device to an amount less than the specified amount.

10. The invention defined in claim 9 wherein the reducing means comprises current limiting impedance added to any normal device in series relation to the flow of current.

11. The invention defined in claim 10 wherein the impedance comprises a sensitive current responsvie device operable by the flow therethrough of the reduced amount of current so as to detect a normal seizure attempt.

12. The invention defined in claim 11 wherein the removing means is controlled by the operation of the sensitive device.

13. An arrangement for controlling seizure of a connector, wherein a connector seizure circuit is provided for recognizing at least one attempt by one or more of a plurality of service circuits to effect normal seizure of the connector, wherein the seizure circuit includes an operable preference relay individual to each service circuit with the preference relays interconnected with each other so that a preference relay of higher assigned preference can normally operate to recognize a normal seizure attempt by the corresponding service circuit even though a preference relay or lower assigned preference is also normally operated, and wherein the seizure circuit also includes an operable connector relay individual to each service circuit with the connector relays controlled by the preference relays so that only one connector relay at a time can be normally operated by a corresponding preference relay to establish one normal seizure at a time, the arrangement comprising:
   A. means independent of the preference relays for registering an attempt to effect the special operation of a connector relay to establish a special seizure of the connector;
   B. special means rendered effective by the registering means, while a special seizure attempt is registered therein, for detecting a normal seizure attempt while preventing a normal operation of any perference relay;
   C. and, means controlled by the effective special means, incident to detection of a normal seizure attempt, for removing the registration from the registering means so as to allow the normal operation of at least one preference relay.

14. The invention defined in claim 13
   A. wherein any preference relay is operable by the flow therethrough of an electrical current equal to or more than a specified amount
   B. and wherein the effective special means comprises means for reducing the amount of current flow through any preferencee relay to an amount less than the specified amount.

15. The invention defined in claim 14 wherein the reducing means comprises current limiting impedance added to any preference relay in series relation to the flow of current.

16. The invention defined in claim 15 wherein the impedance comprises a sensitive relay operable by the flow therethrough of the reduced amount of current so as to detect a normal seizure attempt.

17. The invention defined in claim 16 wherein the removing means is controlled by the operation of the sensitive relay.

* * * * *